US012589539B2

(12) United States Patent
Okubo et al.

(10) Patent No.: US 12,589,539 B2
(45) Date of Patent: Mar. 31, 2026

(54) INJECTION MOLDING DEVICE

(71) Applicant: JTEKT CORPORATION, Kariya (JP)

(72) Inventors: Yusuke Okubo, Aichi (JP); Toshiyuki Baba, Nara (JP); Kouji Kimura, Nara (JP); Tomoya Adachi, Osaka (JP); Hiroshi Kutsumi, Hyogo (JP); Yoshiki Kojima, Nara (JP); Satoshi Haraguchi, Kyoto (JP); Sachiko Tachibana, Aichi (JP); Shota Mizoguchi, Aichi (JP); Toshihiro Moriuchi, Osaka (JP)

(73) Assignee: JTEKT CORPORATION, Kariya (JP)

( * ) Notice: Subject to any disclaimer, the term of this patent is extended or adjusted under 35 U.S.C. 154(b) by 219 days.

(21) Appl. No.: 18/558,494

(22) PCT Filed: May 21, 2021

(86) PCT No.: PCT/JP2021/019301
§ 371 (c)(1),
(2) Date: Nov. 1, 2023

(87) PCT Pub. No.: WO2022/244221
PCT Pub. Date: Nov. 24, 2022

(65) Prior Publication Data
US 2024/0239029 A1 Jul. 18, 2024

(51) Int. Cl.
*B29C 45/76* (2006.01)
*B29C 45/77* (2006.01)

(52) U.S. Cl.
CPC ........ *B29C 45/768* (2013.01); *B29C 45/7646* (2013.01); *B29C 45/77* (2013.01);
(Continued)

(58) Field of Classification Search
CPC .. B29C 2945/76006; B29C 2945/7605; B29C 2945/76066; B29C 2945/76163;
(Continued)

(56) References Cited

U.S. PATENT DOCUMENTS

2019/0344478 A1* 11/2019 Bellio ..................... F26B 17/12
2020/0094461 A1 3/2020 Okubo et al.
2022/0314512 A1* 10/2022 Yamamoto ............. B33Y 50/00

FOREIGN PATENT DOCUMENTS

CN 209955205 U 1/2020
JP 59-146823 A 8/1984
(Continued)

OTHER PUBLICATIONS

English translation of JP2006007466. (Year: 2006).*
International Search Report issued Jul. 20, 2021 in PCT/JP2021/019301, filed on May 21, 2021, 2 pages.

*Primary Examiner* — Xiao S Zhao
*Assistant Examiner* — Victoria Bartlett
(74) *Attorney, Agent, or Firm* — Oblon, McClelland, Maier & Neustadt, L.L.P.

(57) ABSTRACT

An injection molding device includes an injection device including a cylinder, a screw, and a nozzle provided at a front end of the cylinder, for discharging molten resin as the screw advances, a mold including a molded product cavity, and a resin channel between the molded product cavity and a portion abutting the nozzle, a channel pressure measuring device for acquiring channel pressure data in the resin channel, and a determination unit that determines presence/absence of clogging of a gate of the resin channel, based on features of the channel pressure data.

28 Claims, 26 Drawing Sheets

(52) U.S. Cl.
     CPC ............... *B29C 2945/76006* (2013.01); *B29C 2945/7605* (2013.01); *B29C 2945/76066* (2013.01); *B29C 2945/76163* (2013.01); *B29C 2945/76277* (2013.01); *B29C 2945/76381* (2013.01); *B29C 2945/76498* (2013.01); *B29C 2945/76605* (2013.01); *B29C 2945/76665* (2013.01)

(58) Field of Classification Search
     CPC ........... B29C 2945/76277; B29C 2945/76381; B29C 2945/76498; B29C 2945/76605; B29C 2945/76665; B29C 45/76; B29C 45/7646; B29C 45/768; B29C 45/07
     See application file for complete search history.

(56) References Cited

FOREIGN PATENT DOCUMENTS

| | | | |
|----|---------------|-----|---------|
| JP | 2006007466 A | * | 1/2006 |
| JP | 2006-341540 A | | 12/2006 |
| JP | 2009-248437 A | | 10/2009 |
| JP | 2020-49929 A | | 4/2020 |

* cited by examiner

<QUANTIFYING PROCESS: SCREW POSITION>

INJECTION MOLDING DEVICE

TECHNICAL FIELD

The present invention relates to an injection molding device.

BACKGROUND ART

Patent Document 1 describes that in an injection molding device, sensors are installed in an injection device and a mold, and quality of molded products is estimated by machine learning, using detection data from the sensors.

RELATED ART DOCUMENTS

Patent Documents

Patent Document 1: Japanese Unexamined Patent Application Publication No. 2020-49929 (JP 2020-49929 A)

SUMMARY OF THE INVENTION

Problem to be Solved by the Invention

Now, a mold used for injection molding includes a molded product cavity as a portion for molding a molded product, and resin channels (runners, sprues, and gates) between the molded product cavity and a portion that abuts a nozzle of the injection device. There are cases in which, for example, cold slag, foreign matter, or the like, may cause trouble in which a gate of a resin channel is temporarily clogged. When the gate is clogged, a state occurs in which molten resin does not flow from the resin channel to the molded product cavity, which leads to lower dimensional accuracy of the molded product and instability in dimensional accuracy.

When executing a plurality of successive molding cycles for molding molded products, clogging of the gate may occur temporarily, following which the clogging of the gate is resolved. Also, when molten resin is being supplied to the molded product cavity in performing molding of one molded product, clogging of the gate may occur temporarily, following which clogging of the gate is resolved during the molding of the molded product. Thus, there are cases in which clogging of gates does not only occur continuously over long periods of time, but also occurs temporarily, and discovery thereof is not easy in some cases.

The present invention has been made in light of the foregoing situation, and accordingly it is an object thereof to provide an injection molding device that is capable of determining presence/absence of clogging of gates.

Means for Solving the Problem

One aspect of the present invention is an injection molding device, including an injection device including a cylinder, a screw, and a nozzle provided at a front end of the cylinder, for discharging molten resin as the screw advances, a mold including a molded product cavity, and a resin channel between the molded product cavity and a portion abutting the nozzle, a channel pressure measuring device for acquiring channel pressure data in the resin channel, and a determination unit that determines presence/absence of clogging of a gate of the resin channel, based on features of the channel pressure data.

Effects of the Invention

When molding a molded product, molten resin is supplied from the injection device to the resin channel of the mold, and supplied from the resin channel to the molded product cavity. When the gate of the resin channel of the mold becomes clogged during molding, the molten resin will be in a state of not flowing from the resin channel to the molded product cavity, or will be in a state of being difficult to flow.

The above injection molding device determines presence/absence of clogging of gates based on the features of channel pressure data in the resin channels of the mold, taking note of fluctuation in pressure data in the resin channel due to clogging of gates. The determination unit of the injection molding device can determine presence/absence of clogging of the gate, by making use of the features of the channel pressure data in the resin channel being affected by clogging of the gate. Determining presence/absence of clogging of gates enables detection of deterioration in the dimensional accuracy of the molded product, and enables stabilization the dimensional accuracy.

BRIEF DESCRIPTION OF THE DRAWINGS

FIG. 7 is a functional block diagram illustrating an injection molding device according to a first embodiment.

FIG. 20 is a functional block diagram illustrating an injection molding device corresponding to a first specific example and a second specific example of a resin viscosity estimation method according to the second embodiment.

FIG. 22 is a functional block diagram illustrating an injection molding device corresponding to a fifth specific example of the resin viscosity estimation method according to the second embodiment.

MODES FOR CARRYING OUT THE INVENTION

1. Configuration of Injection Molding Device 1

Figure 1:
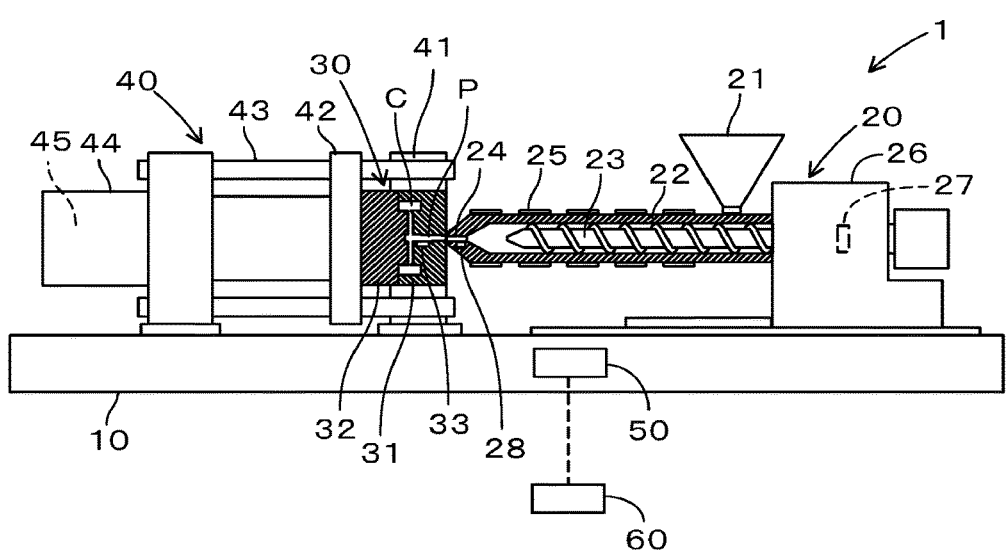
FIG. 1 is a diagram illustrating a mechanical configuration of an injection molding device.

An injection molding device 1 will be described with reference to FIG. 1. The injection molding device 1 is a device for molding resin molded products using a mold 30. The injection molding device 1 primarily includes a bed 10, an injection device 20, the mold 30, a mold clamping device 40, a control device 50, and a gate clogging determination computer device 60. The bed 10 is a member installed on an installation face.

The injection device 20 is disposed on the bed 10. The injection device 20 is a device that melts resin, which is a molding material, applies pressure to the molten resin, and performs supplying thereof to a molded product cavity C of the mold 30. The injection device 20 includes a hopper 21, a cylinder 22, a screw 23, a nozzle 24, a heater 25, a driving device 26, a screw pressure measuring device 27, and a nozzle pressure measuring device 28.

The hopper 21 is an inlet for resin pellets (granular molding material) serving as raw material for the molding material. The cylinder 22 stores molten resin obtained by heating and melting the pellets placed into the hopper 21. The cylinder 22 is also provided so as to be movable in an axial direction of the cylinder 22 with respect to the bed 10. The screw 23 is disposed within the cylinder 22, and is provided so as to be rotatable and also movable in the axial direction. The nozzle 24 is a discharge port provided at a front end of the cylinder 22, and discharges molten resin within the cylinder 22 as the screw 23 advances.

The heater 25 is provided, for example, on an outer peripheral face of the cylinder 22, or embedded within the cylinder 22, to heat the resin inside the cylinder 22. That is to say, the heater 25 melts the pellets, and also maintains the molten resin in a molten state. The driving device 26 moves the cylinder 22 in the axial direction (forward and backward), rotates and moves the screw 23 in the axial direction (forward and backward), and so forth.

The screw pressure measuring device 27 is provided near a basal end of the screw 23, for example, and acquires data of pressure that the screw 23 receives from the molten resin in the cylinder 22 (hereinafter referred to as "screw pressure data"). Note that the screw pressure measuring device 27 corresponds to a screw pressure measuring device, a second screw pressure measuring device, and a third screw pressure measuring device in the present invention. Also, the screw pressure data corresponds to screw pressure data, second screw pressure data, and third screw pressure data in the present invention.

The nozzle pressure measuring device 28 is provided in the nozzle 24 and acquires data of pressure that the nozzle 24 receives from the molten resin when the molten resin flows through the nozzle 24 (hereinafter referred to as "nozzle pressure data"). In addition to the screw pressure measuring device 27 and the nozzle pressure measuring device 28, the injection device 20 also includes sensors for acquiring the position of the cylinder 22, the position of the screw 23, the moving speed of the screw 23, the temperature of the heater 25, the state of the driving device 26, and so forth.

Note that the nozzle pressure measuring device 28 corresponds to a nozzle pressure measuring device, a second nozzle pressure measuring device, a third nozzle pressure measuring device, and a fourth nozzle pressure measuring device according to the present invention. Also, the nozzle pressure data corresponds to nozzle pressure data, second nozzle pressure data, third nozzle pressure data, and fourth nozzle pressure data according to the present invention.

The mold 30 includes a first mold 31 that is a fixed side, and a second mold 32 that is a movable side. The mold 30 forms the molded product cavity C between the first mold 31 and the second mold 32 by mold clamping of the first mold 31 and the second mold 32 being performed. The first mold 31 and the second mold 32 are provided with a resin channel P between the molded product cavity C and a portion that abuts the nozzle 24 of the injection device 20. The resin channel P is a channel (sprue, runner, gate) that guides the molten material supplied from the nozzle 24 of the injection device 20 to the molded product cavity C.

Further, the mold 30 includes a channel pressure measuring device 33 that acquires pressure data in the resin channel P (hereinafter referred to as "channel pressure data"). The channel pressure data is data of pressure that an inner wall face of the resin channel P receives from the molten resin flowing through the resin channel P.

The mold clamping device 40 is disposed on the bed 10 so as to face the injection device 20. The mold clamping device 40 performs operations of opening and closing the mold 30 that is mounted, and also keeps the mold 30 from opening under pressure of the molten material injected into the molded product cavity C in a state in which the mold 30 is tightened down.

The mold clamping device 40 includes a fixed platen 41, a movable platen 42, tie bars 43, a driving device 44, and a mold clamping device measuring device 45. The first mold 31 is fixed to the fixed platen 41. The second mold 32 is fixed to the movable platen 42. The movable platen 42 can move toward and away from the fixed platen 41. The tie bars 43 support movement of the movable platen 42. The driving device 44 is made up of, for example, a cylinder device, and moves the movable platen 42. The mold clamping device measuring device 45 acquires mold clamping force, mold temperature, state of the driving device 44, and so forth.

The control device 50 controls the driving device 26 of the injection device 20 and the driving device 44 of the mold clamping device 40. The gate clogging determination computer device 60 determines presence/absence of clogging of a gate P3 (illustrated in FIG. 2) in the resin channel P of the mold 30. The gate clogging determination computer device 60 is made up of a processor, a storage device, and so forth, and performs processing by executing a computer program. The gate clogging determination computer device 60 uses, for example, control data from the control device 50, and pressure data and so forth that is acquired by the screw pressure measuring device 27, the nozzle pressure measuring device 28, the channel pressure measuring device 33, and so forth, to determine presence/absence of clogging of the gate.

2. Detailed Configuration of Mold 30

Figure 2:
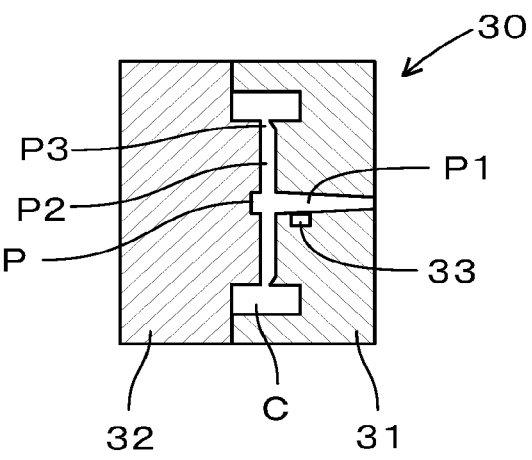
FIG. 2 is an enlarged sectional view of a mold in FIG. 1.
Figure 3:
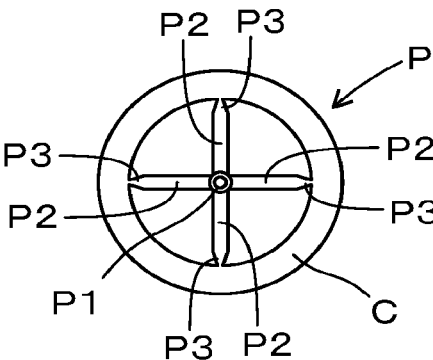
FIG. 3 is a view illustrating only a space portion (molded product cavity and resin channel) of the mold, viewed from an axial direction of a sprue (viewed from the right in FIG. 2).

A detailed configuration of the mold 30 will be described with reference to FIG. 2 and FIG. 3. The mold 30 has the molded product cavity C for molding a molded product. The molded product cavity C is formed by the first mold 31 and the second mold 32. In the present embodiment, the molded product cavity C is formed in an annular shape, for example, but it can be in any shape such as a letter-C shape, a letter-U shape, and so forth. The molded product cavity C may be formed at just one location, or may be formed at a plurality of locations. In FIG. 2 and FIG. 3, one molded product cavity C is illustrated, in order to facilitate description.

The mold 30 also has the resin channel P that connects between the portion abutting the nozzle 24 (illustrated in FIG. 1) and the molded product cavity C. The resin channel P includes a sprue P1 (also called a sprue), a runner P2, and the gate P3. The sprue P1 is a path over which the molten material is introduced from the nozzle 24. The sprue P1 is formed, for example, rectilinearly from the abutting portion with the nozzle 24.

The runner P2 is a channel formed at an angle from the sprue P1. That is to say, the molten resin introduced into the sprue P1 flows into the runner P2. For example, as illustrated in FIG. 3, in the present embodiment, a plurality of the runners P2 is formed branching radially from the sprue P1 toward one molded product cavity C. Note that even when a plurality of molded product cavities C is formed, the plurality of runners P2 are formed by branching from the sprue P1 toward each of the plurality of molded product cavities C.

The gate P3 is situated at a distal end of the runner P2, and is a channel that guides the molten resin from the runner P2 to the molded product cavity C. A channel cross-sectional area of the gate P3 is formed so as to be smaller than a channel cross-sectional area of the runner P2. In the present embodiment, a plurality of gates P3 is formed connecting each of the plurality of runners P2 and one molded product cavity C. Accordingly, even if one of the plurality of gates P3 is clogged, the molten resin flows into the molded product cavity C from the other gates P3.

The mold 30 is provided with the channel pressure measuring device 33, as illustrated in FIG. 2. The channel pressure measuring device 33 is provided on the resin channel P, at one of partway along the sprue P1, an end portion of the sprue P1, partway along the runner P2, the distal end of the runner P2, or the like. That is to say, the channel pressure measuring device 33 acquires pressure data at a position on the resin channel P that is different from the gate P3. Note that the channel pressure measuring device 33 may be provided at one location in the mold 30, or may be provided at a plurality of locations.

3. Injection Molding Method

Figure 4:
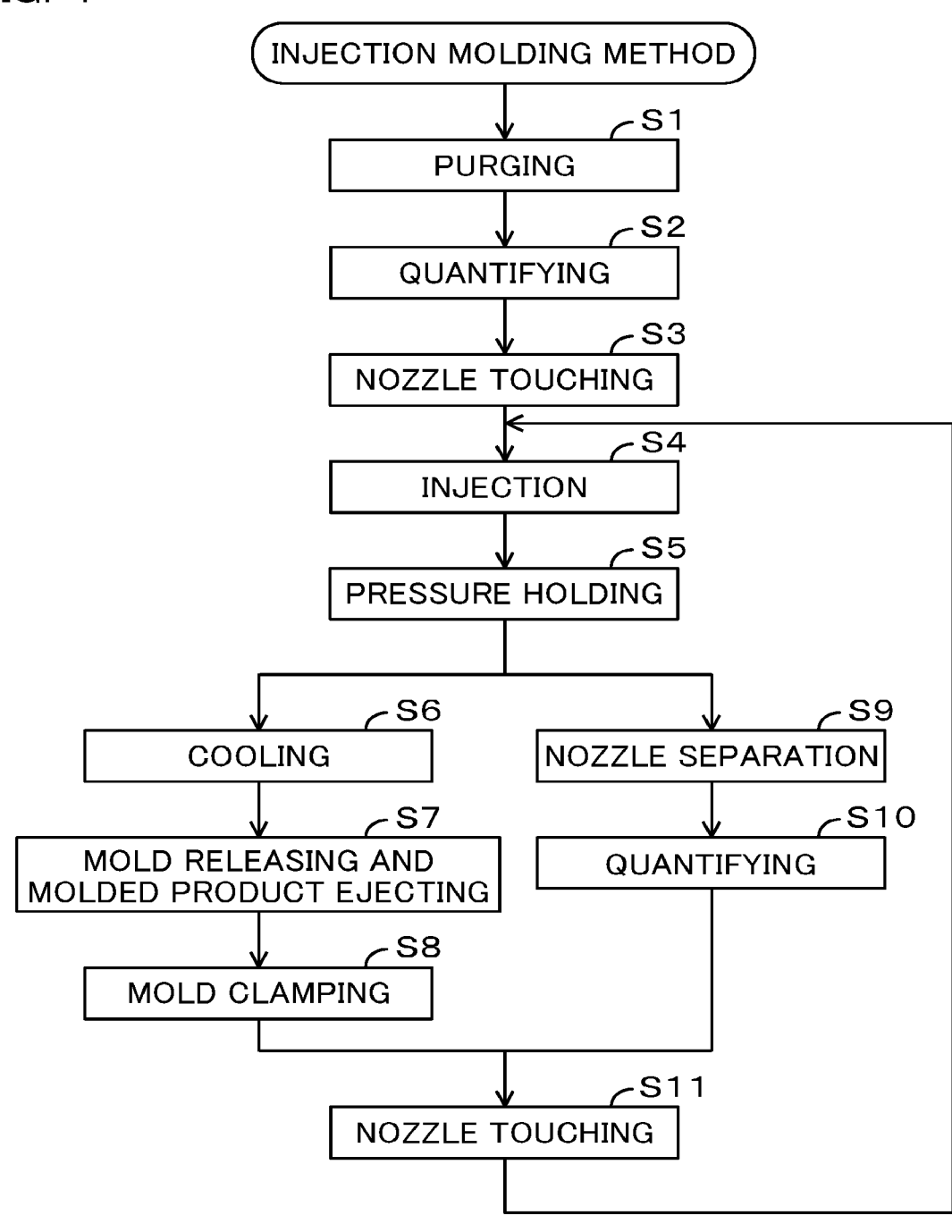
FIG. 4 is a flowchart showing an injection molding method.

An injection molding method for a molded product by the injection molding device 1 will be described with reference to FIG. 4. The injection molding method is executed by the control device 50 of the injection molding device 1.

First, the control device 50 executes a purging process S1, in which molten resin in the cylinder 22 is discharged from the nozzle 24 in a state in which the nozzle 24 is separated from the mold 30, before performing successive molding cycles a plurality of times. The purging process S1 is performed, for example, for the purpose of discharging thermally-deteriorated resin or replacing with a different resin material. In the purging process S1, the molten resin in the cylinder 22 is discharged from the nozzle 24 by advancing the screw 23.

Subsequently, the control device 50 executes a quantifying process S2 in which a predetermined amount of molten resin is pooled at a front side of the cylinder 22, by retracting the screw 23 to a predetermined position while rotating the screw 23. In the quantifying process S2, the screw 23 that is located at a front position is rotated to move the molten resin to a front end side of the cylinder 22, and the screw 23 is retracted to the predetermined position by counteraction to the forward movement of the molten resin. Thus, the predetermined amount of the molten resin is pooled in the cylinder 22, between a distal end of the screw 23 and the nozzle 24.

Subsequently, the control device 50 executes a nozzle touching process S3, in which the nozzle 24 is abutted against the mold 30 by advancing the cylinder 22. Note that mold clamping of the mold 30 is assumed to be performed at this time. However, mold clamping may be performed after the nozzle touching process S3.

Subsequently, the control device 50 executes the following molding cycle of S4 to S11. The control device 50 advances the screw 23 while performing speed control of the screw 23, and executes an injection process S4 in which molten resin is injected from the nozzle 24 into the mold 30. In the injection process S4, the molten resin flows from the nozzle 24 into the resin channel P, and flows from the resin channel P into the molded product cavity C. In the injection process S4, the molten resin is supplied to the greater part (e.g., 90% to 95%) of the molded product cavity C.

Following the injection process S4, the control device 50 executes a pressure-holding process S5 for applying a holding pressure to the molten resin in the molded product cavity C, by performing pressure control of the pressure applied to the screw 23. In the pressure-holding process S5, the screw 23 is controlled to apply a predetermined pressure, thereby further advancing the screw 23 and supplying the molten resin from the nozzle 24 to the molded product cavity C over the resin channel P. In the pressure-holding process S5, the molded product cavity C is completely filled with the molten resin.

Subsequently, the control device 50 stops applying pressure to the screw 23 and also stops heating the mold 30, and cools the mold 30, thereby executing a cooling process S6 in which the molten resin in the mold 30 is cooled. In the cooling process S6, the molten resin inside the mold 30 hardens. After the cooling process S6, the control device 50 controls the mold clamping device 40 to separate the second mold 32 from the first mold 31, and perform a mold releasing and molded product ejecting process S7, in which the molded product is ejected. Subsequently, the control device 50 controls the mold clamping device 40 to match the second mold 32 with the first mold 31, and executes a mold clamping process S8 in which the molds are clamped.

Further, after the pressure-holding process S5 is completed, the control device 50 executes a nozzle separation process S9 in which the nozzle 24 is separated from the mold 30 by retracting the cylinder 22. Following the nozzle separation process S9, the control device 50 rotates the screw 23 located at the front position to move the molten resin to the front end side of the cylinder 22, and the screw 23 is retracted to the predetermined position by counteraction to the forward movement of the molten resin, thereby executing a quantifying process S10 in which the predetermined amount of molten resin is pooled at the front side of the cylinder 22.

After the mold clamping process S8 and the quantifying process S10 are completed, the control device 50 advances the cylinder 22 to perform a nozzle touching process S11 in which the nozzle 24 is abutted with the mold 30. However, the mold clamping process S8 may be executed after the nozzle touching process S11. Then after the nozzle touching process S11, the injection process S4 described above is repeated again.

4. Behavior of Screw Pressure Data and Channel Pressure Data

Behavior (temporal change) of the screw pressure data and behavior (temporal change) of the channel pressure data in the injection process S4 and the pressure-holding process S5 will be described with reference to FIG. 5 and FIG. 6. First, a state in which there is no clogging of the gate P3 will be described with reference to continuous lines in FIG. 5 and FIG. 6.

Figure 5:
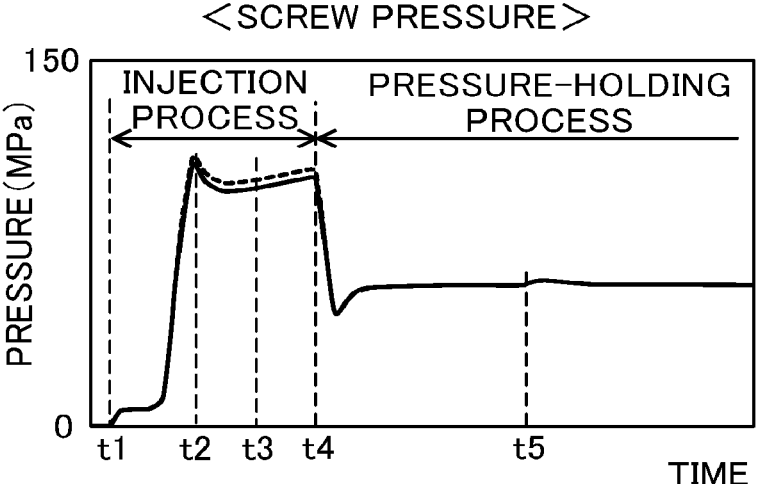
FIG. 5 is a graph showing temporal change in screw pressure data in an injection process and a pressure-holding process. A continuous line indicates a case with no gate clogging, and a dashed line indicates a case with gate clogging.

As indicated by the continuous line in FIG. 5, at time t1, the injection process S4 is started, and accordingly the screw 23 advances and the screw pressure data rises. Thereafter, in the present embodiment, the speed of advance of the screw 23 is initially set to a low speed, and then switched to a high speed.

Figure 6:
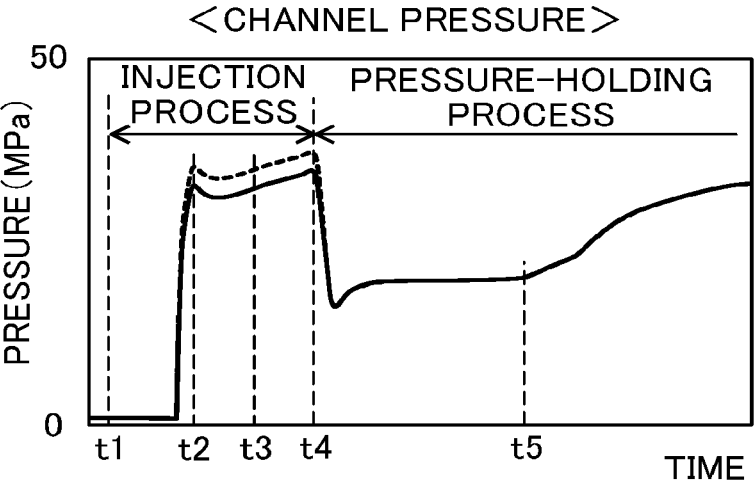
FIG. 6 is a graph showing temporal change in channel pressure data in the injection process and the pressure-holding process. A continuous line indicates a case with no gate clogging, and a dashed line indicates a case with gate clogging.

As shown by the continuous line in FIG. 5 and the continuous line in FIG. 6, when the speed of advance of the screw 23 is switched to the high speed, the molten resin flows into the resin channel P of the mold 30, and the screw pressure data and the channel pressure data rise sharply. The molten resin then flows into the molded product cavity C from the gate P3 of the resin channel P, and accordingly the screw pressure data and the channel pressure data change so as to slightly fall, and then gradually rise. Thus, in the injection process S4, the screw pressure data and the channel pressure data reach their maximum values at a pressure peak time t2.

The time at which the injection process S4 ends is t4, and in the injection process S4, the time between the pressure peak time t2 and the injection process end time t4 is t3. The time t3 is, for example, an intermediate time between the pressure peak time t2 and the injection process end time t4, but it may be a time shifted from this intermediate time.

Switching from the injection process S4 to the pressure-holding process S5 causes the screw pressure data and the channel pressure data fall to near a desired holding pressure under pressure control in the pressure-holding process S5. Normally, the screw pressure data and the channel pressure data rise toward the vicinity of the desired hold pressure immediately after dropping to a pressure slightly below the desired holding pressure.

The pressure-holding process S5 is then continued, and when the molded product cavity C is completely filled with the molten resin, i.e., at a filling completion time t5, the screw pressure data and the channel pressure data rise. Due to pressure control being performed, the screw pressure data reaches the desired holding pressure immediately thereafter. On the other hand, the channel pressure data gradually rises after the filling completion time t5.

Next, a state in which there is clogging of the gate P3 will be described with reference to dashed lines in FIG. 5 and FIG. 6. In the injection process S4, the screw pressure data and the channel pressure data become greater than that when there is no clogging of the gate P3. Here, a rate of rise in the channel pressure data is greater than a rate of rise in the screw pressure. The rate of rise is the proportion of increase in pressure when the gate P3 is clogged relative to when the gate P3 is not clogged. Accordingly, both the screw pressure data and the channel pressure data are affected by the presence/absence of clogging of the gate P3. However, it can be seen that the channel pressure data is affected more than the screw pressure data.

5. Outline of the Embodiments

An outline of the embodiments will be described with respect to determination of clogging of the gate P3.

(A) First embodiment: The presence/absence of gate clogging is determined by machine learning, based on channel pressure data (later time period in injection process S4) and screw pressure data (later time period in injection process S4).

(A1) First modification of first embodiment: The presence/absence of gate clogging is determined by threshold values set in advance, based on channel pressure data (later time period in injection process S4) and screw pressure data (later time period in injection process S4).

(A2) Second modification of first embodiment: Pressure data in previous time period between the peak time and the end time of the injection process S4 is used.

(A3) Third modification of first embodiment: Only channel pressure data is used.

(B) Second embodiment: The presence/absence of gate clogging is determined by machine learning, based on channel pressure data and estimated resin viscosity.

(B1) First modification of second embodiment: The presence/absence of gate clogging is determined by machine learning, based on channel pressure data, for each estimated resin viscosity.

(B2) Second modification of second embodiment: The presence/absence of gate clogging is determined by threshold values set in advance, based on channel pressure data, for each estimated resin viscosity.

(C1) First specific example of resin viscosity estimation method: The time to the pressure peak time in the injection process S4 is used, using channel pressure data.

(C2) Second specific example of resin viscosity estimation method: The time filling completion time of molded product cavity in the pressure-holding process S5 is used, using channel pressure data.

(C3) Third specific example of resin viscosity estimation method: The time to the pressure peak time in the injection process S4 is used, using screw pressure data.

(C4) Fourth specific example of resin viscosity estimation method: The time to filling completion time of molded product cavity in the pressure-holding process S5 is used, using screw pressure data.

(C5) Fifth specific example of resin viscosity estimation method: Nozzle pressure data and screw movement speed data in the purging process S1 are used.

(C6) Sixth specific example of resin viscosity estimation method: Nozzle pressure data and screw movement speed data in the injection process S4 are used.

(C7) Seventh specific example of resin viscosity estimation method: The time required for the quantifying processes S2 and S10 is used.

(C8) Eighth specific example of resin viscosity estimation method: A plurality out of the above first specific example to the seventh specific example is used in combination.

6. Injection Molding Device 1 According to First Embodiment

Figure 7:
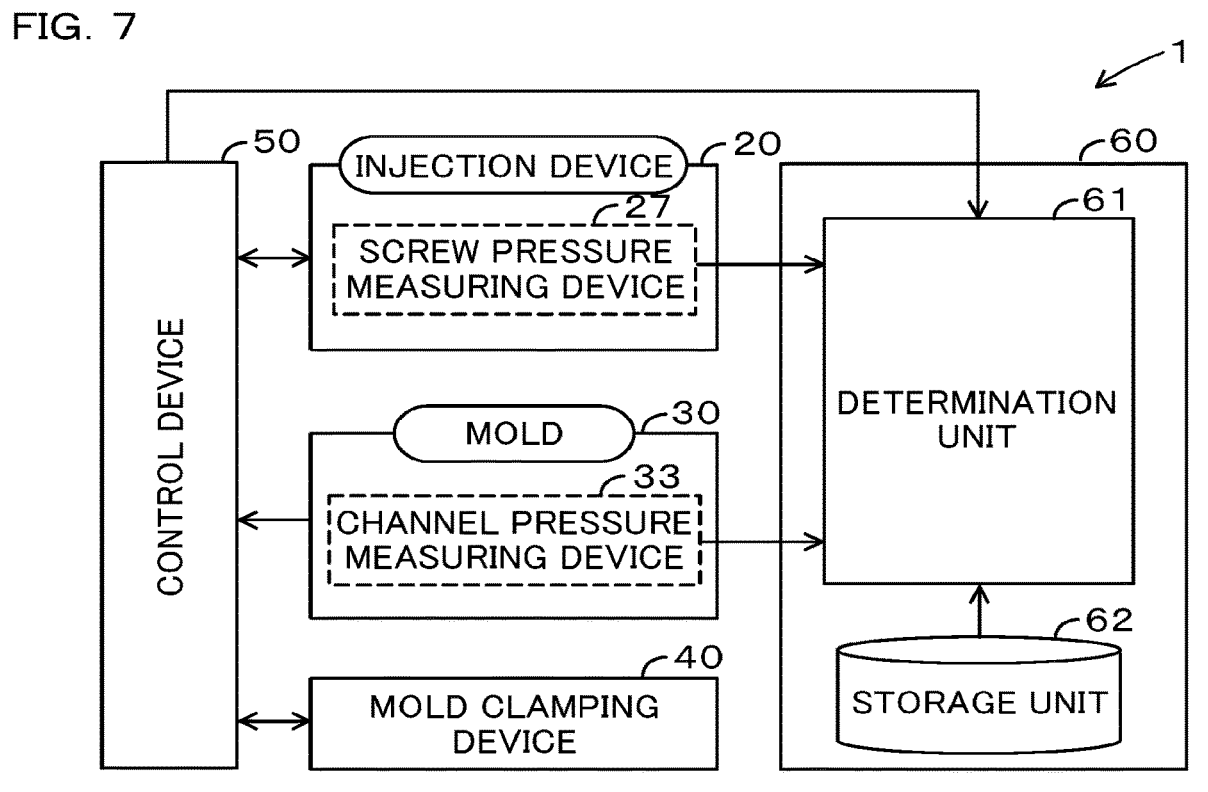
Figure 8:
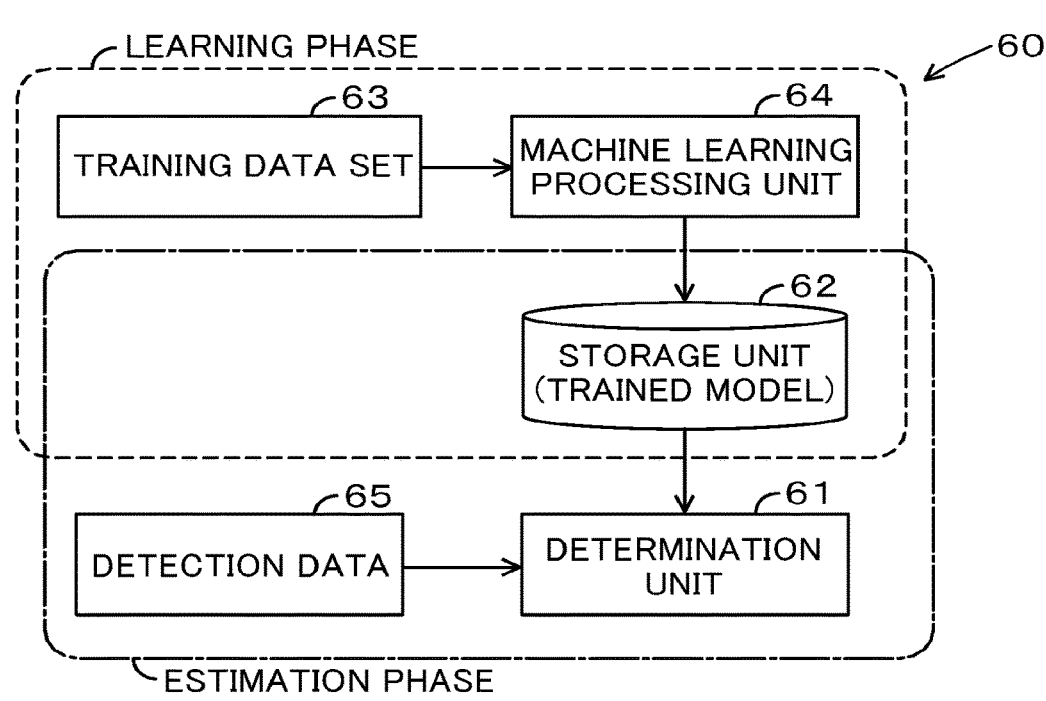
FIG. 8 is a functional block diagram illustrating processing performed by a gate clogging determination computer device that makes up the injection molding device according to the first embodiment.

An injection molding device 1 according to a first embodiment will be described with reference to FIG. 7 and FIG. 8. The injection molding device 1 includes the injection device 20, the mold 30, the mold clamping device 40, the control device 50, and the computer device 60, as illustrated in FIG. 7. In FIG. 7, only part of functional parts of the injection molding device 1 are illustrated. Also, the computer device 60 will be described below.

The computer device 60 includes a determination unit 61 and a storage unit 62. The determination unit 61 is made up of the processor that makes up the computer device 60 described above, and functions by executing a computer program. The storage unit 62 is made up of the storage device that makes up the computer device 60 described above.

The determination unit 61 determines presence/absence of clogging of the gate P3, out of the resin channel P. The gate P3 is positioned between the runner P2 and the molded product cavity C, as described above, and has a channel cross-sectional area that is smaller than that of the runner P2. Accordingly, there is concern that the gate P3 will become clogged by, for example, cold slag, foreign matter, or the like. The determination unit 61 determines presence/absence of clogging of this gate P3.

In particular, the determination unit 61 determines presence/absence of clogging of some of the gates P3 of the plurality of gates P3. Further, when executing the molding cycle described above a plurality of times successively, a phenomenon occurs in which clogging of the gate P3 temporarily occurs, following which the clogging of the gate is resolved. In this phenomenon, the determination unit 61 determines presence/absence of temporary clogging of the gate P3.

Also, the determination unit 61 determines presence/absence of clogging of the gate P3 based on at least the channel pressure data acquired by the channel pressure measuring device 33. However, in the present embodiment, the determination unit 61 determines presence/absence of clogging of the gate P3, using the screw pressure data acquired by the screw pressure measuring device 27 in addition to the channel pressure data.

Further, the determination unit 61 determines presence/absence of clogging of the gate P3 based on the features of the channel pressure data and features of the screw pressure data rather than the channel pressure data and the screw pressure data themselves. Accordingly, the determination unit 61 extracts the features from the acquired channel pressure data, and also extracts the features from the acquired screw pressure data.

In the present embodiment, the determination unit 61 determines presence/absence of clogging of the gate P3 using the features of the channel pressure data in the injection process S4 (time t1 to t4) and the features of the screw pressure data in the injection process S4. In particular, the determination unit 61 uses the features of the channel pressure data and the features of the screw pressure data after the pressure reaches the pressure peak in the injection process S4, i.e., at time t2 to t4.

More specifically, in the present embodiment, the determination unit 61 uses the features of the channel pressure data in a latter time period (t3 to t4) closer to the pressure-holding process S5 in the injection process S4 and the features of the screw pressure data in the latter time period (t3 to t4) closer to the pressure-holding process S5 in the injection process S4.

Examples of the features include a time-integrated value of the channel pressure data in the later time period (t3 to t4), a time-integrated value of the screw pressure data in the later time period (t3 to t4), and so forth. Note that the features that are used may be a maximum value, minimum value, median value, average value, first quartile, third quartile, variance, standard deviation, peakedness, skewness, and so forth of the channel pressure data in the latter period (t3 to t4). Also, the determination unit 61 may use a plurality of features.

Also, in the present embodiment, the determination unit 61 applies machine learning to determine presence/absence of clogging of the gate P3. Accordingly, the determination unit 61 determines presence/absence of clogging of the gate P3 using a trained model that is generated in advance. In particular, when applying machine learning, the determination unit 61 can easily apply a plurality of features.

The storage unit 62 stores information used by the determination unit 61 to determine presence/absence of clogging of the gate P3. In the present embodiment, the storage unit 62 stores a trained model generated by performing machine learning using a training data set. The determination unit 61 uses the trained model stored in the storage unit 62.

The functions of the computer device 60 when applying machine learning will be described with reference to FIG. 8. As a learning phase, first, a training data set 63 is prepared. The training data set 63 includes features of channel pressure data, features of screw pressure data, and label data indicating presence/absence of clogging of the gate P3.

As a learning phase, a machine learning processing unit 64 in the computer device 60 performs machine learning using the training data set 63 to generate one trained model.

The trained model is stored in the storage unit 62. In the present embodiment, the trained model uses the features of the channel pressure data and the features of the screw pressure data as explanatory variables, and presence/absence of clogging of the gate P3 as an objective variable.

Subsequently, as an estimation phase, the determination unit 61 acquires channel pressure data and screw pressure data as detection data 65. The determination unit 61 then calculates the features of the channel pressure data, and also calculates the features of the screw pressure data. Subsequently, the determination unit 61 determines (outputs) presence/absence of clogging of the gate P3, using the trained model stored in the storage unit 62, by inputting the features of the channel pressure data and the features of the screw pressure data.

7. Effects of First Embodiment

When molding a molded product, molten resin is supplied from the injection device 20 to the resin channel P of the mold 30, and is supplied from the resin channel P to the molded product cavity C. When the gate P3 of the resin channel P of the mold 30 becomes clogged during molding, the molten resin will be in a state of not flowing from the resin channel P to the molded product cavity C, or will be in a state of being difficult to flow.

The determination unit 61 of the injection molding device 1 determines presence/absence of clogging of the gate P3 based on the features of channel pressure data in the resin channel P of the mold 30, taking note of fluctuation in channel pressure data in the resin channel P due to clogging of gates P3. The determination unit 61 of the injection molding device 1 can determine presence/absence of clogging of the gate P3, by making use of features of the channel pressure data in the resin channel P being affected by clogging of the gate P3. Determining presence/absence of clogging of the gate P3 enables detection of deterioration in the dimensional accuracy and so forth of the molded product, and enables stabilization the dimensional accuracy.

In particular, as shown in FIG. 6, there is a great difference in channel pressure data depending on presence/absence of clogging of the gate P3. Accordingly, using the features of the channel pressure data enables determination of presence/absence of clogging of the gate P3 with high accuracy.

Further, the determination unit 61 uses the features of the screw pressure data in addition to the features of the channel pressure data in determining presence/absence of clogging of the gate P3. As shown in FIGS. 5 and 6, in the injection process S4, not only the channel pressure data but the screw pressure data also changes, depending on presence/absence of clogging of the gate P3. Accordingly, the determination unit 61 can determine presence/absence of clogging of the gate P3 with higher accuracy, by using the features of the screw pressure data in addition to the features of the channel pressure data.

Also, the determination unit 61 uses the data in the injection process S4, out of the channel pressure data and the screw pressure data. Especially in the injection process S4, the pressure changes depending on presence/absence or clogging of the gate P3. Accordingly, the determination unit 61 can determine presence/absence of clogging of the gate P3 with high accuracy, by using the pressure data in the injection process S4.

Further, the determination unit 61 uses the channel pressure data and the screw pressure data in the latter time period (t3 to t4) in the injection process S4, closer to the pressure-holding process S5. The pressure data is relatively stable in the latter period (t3 to t4) of the injection process S4. Accordingly, the determination unit 61 can determine presence/absence of clogging of the gate P3 with high accuracy. Also, the determination unit 61 determines presence/absence of clogging of the gate P3 by machine learning. Determination by machine learning is particularly useful when using a plurality of features.

8. First Modification of First Embodiment

An injection molding device 1 according to a first modification of the first embodiment will be described with reference to FIG. 9. In the first embodiment described above, the storage unit 62 of the computer device 60 stores a trained model generated by machine learning, and the determination unit 61 uses the trained model to determine presence/absence of clogging of the gate P3.

In the present modification, the storage unit 62 stores a threshold value Th used for determining presence/absence of clogging of the gate P3. The threshold value Th is set in relation to the screw pressure data and the channel pressure data, as shown in FIG. 9. As shown in FIGS. 5 and 6, both the channel pressure data and the screw pressure data rise due to clogging of the gate P3. When clogging of the gate P3 occurs, the amount of rise of the channel pressure data becomes larger than the amount of rise of the screw pressure data.

Figure 9:
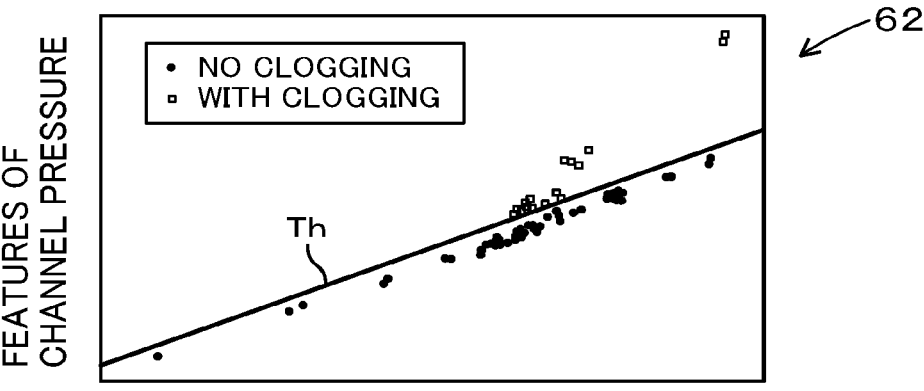
FIG. 9 is a diagram describing threshold values stored in a storage unit according to a first modification of the first embodiment.

Accordingly, as shown in FIG. 9, the determination unit 61 determines that there is clogging of the gate P3 in a region above the threshold value Th indicated by a continuous line in a two-dimensional coordinate system representing the relation between the screw pressure data and the channel pressure data. On the other hand, the determination unit 61 determines that there is no clogging of the gate P3 in a region below the threshold value Th.

The threshold value Th can be set by obtaining a great count of channel pressure data and of screw pressure data for each of presence/absence of clogging of the gate P3. Note that in FIG. 9, the threshold value Th is shown by a straight line, but may be set by a curve.

9. Second Modification of First Embodiment

An injection molding device 1 according to a second modification of the first embodiment will be described with reference to FIG. 10. In the first embodiment described above, the determination unit 61 determines presence/absence of clogging of the gate P3 using the screw pressure data in addition to the channel pressure data.

Figure 10:
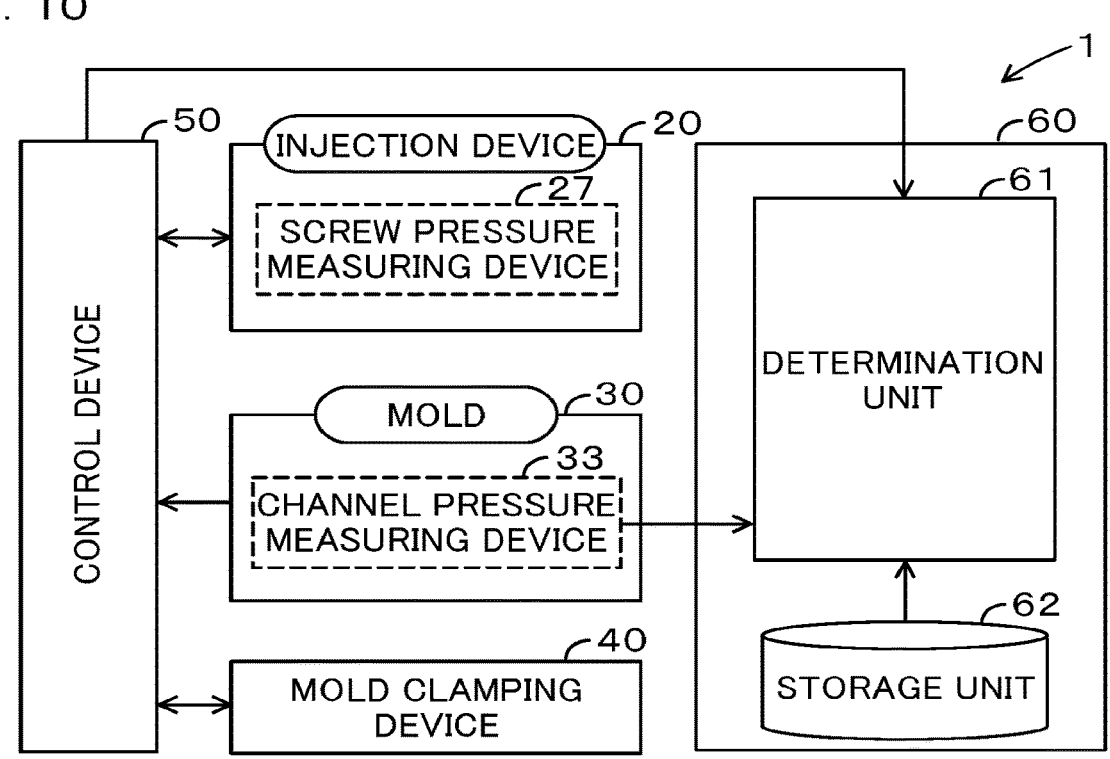
FIG. 10 is a functional block diagram illustrating an injection molding device according to a second modification of the first embodiment.

In the present modification, as illustrated in FIG. 10, the determination unit 61 determines presence/absence of clogging of the gate P3 using channel pressure data. The determination unit 61 does not use screw pressure data. As shown in FIG. 6, the channel pressure data changes greatly depending on presence/absence of clogging of the gate P3. Accordingly, the determination unit 61 can sufficiently determine presence/absence of clogging of the gate P3.

10. Third Modification of First Embodiment

Figure 11:
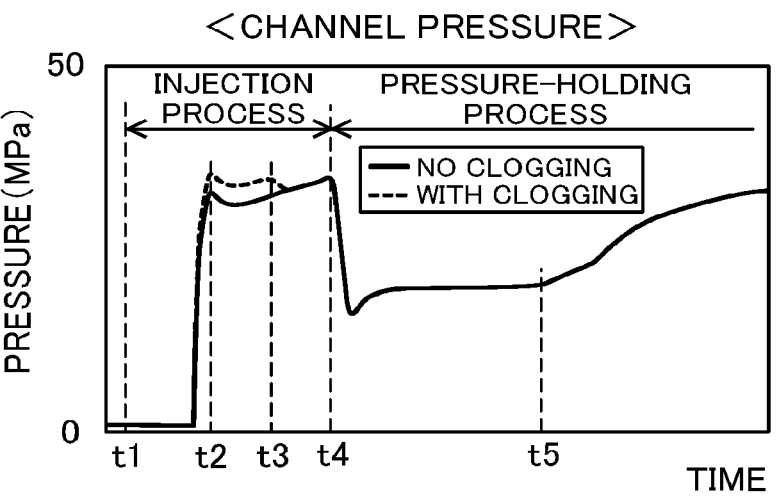
FIG. 11 is a graph showing temporal change in channel pressure data in the injection process and the pressure-holding process, according to a third modification of the first embodiment. A continuous line indicates a case with no gate clogging, and a dashed line indicates a case with gate clogging.

An injection molding device 1 according to a third modification of the first embodiment will be described with reference to FIG. 11. In the above-described first embodiment, the determination unit 61 determines presence/absence of clogging of the gate P3 using the channel pressure data and the screw pressure data during the latter period (t3 to t4) of the injection process S4.

In the injection process S4, when molten resin is being supplied to the molded product cavity C in molding of one molded product, in some cases, a phenomenon occurs in which the gate P3 is temporarily clogged and then the clogging of the gate P3 is resolved. In such a case, the channel pressure data changes in the injection process S4 as indicated by a dashed line in FIG. 11.

Accordingly, in order to determine temporary clogging of the gate P3 in such a case, in the present modification, the determination unit 61 uses, from between the pressure peak time t2 and the injection process end time t4 in the injection process S4, the features of the channel pressure data and the features of the screw pressure data in the previous time period (t2 to t3). Specifically, the determination unit 61 uses a time-integrated value of the time period (t2 to t3) as the features. By doing so, the determination unit 61 can detect pressure changes as indicated by the dashed line in FIG. 11, and determine presence/absence of clogging of the gate P3.

11. Injection Molding Device 1 According to Second Embodiment

Figure 12:
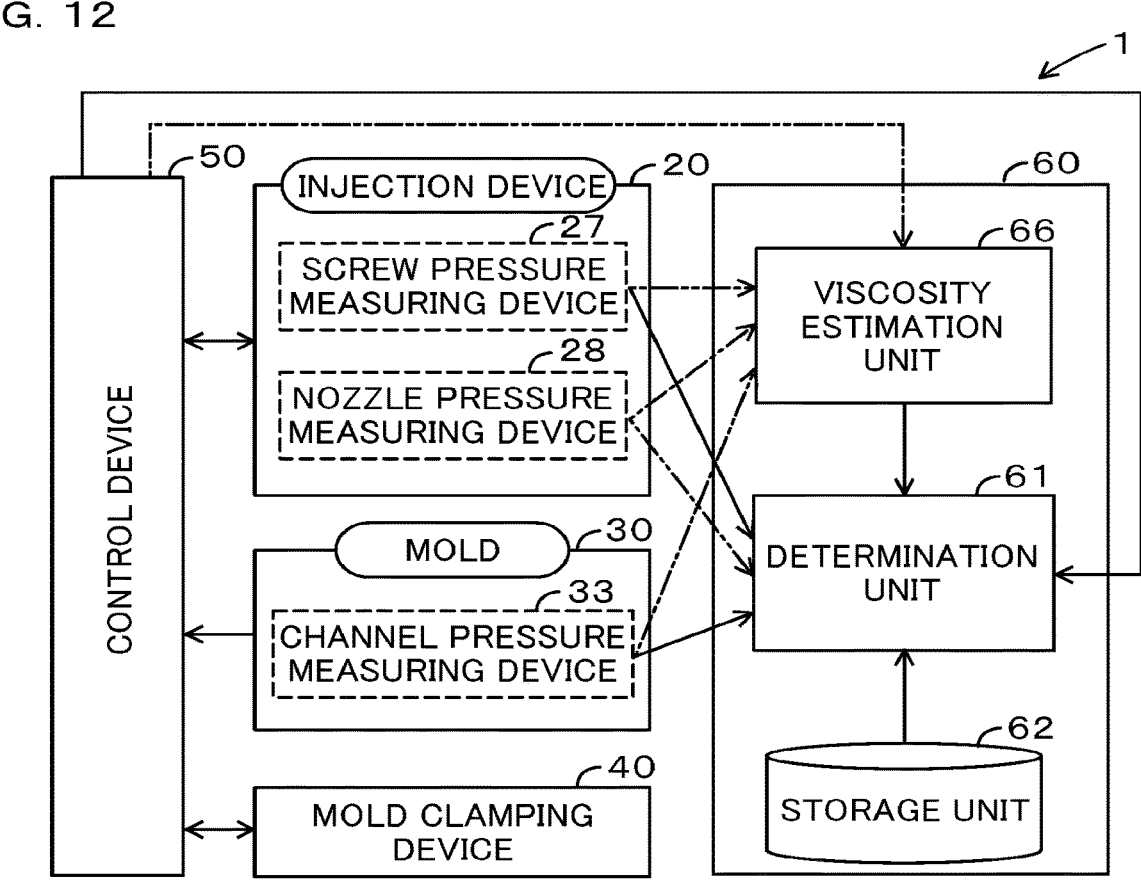
FIG. 12 is a functional block diagram illustrating an injection molding device according to a second embodiment.

An injection molding device 1 according to a second embodiment will be described with reference to FIG. 12. As illustrated in FIG. 12, the computer device 60 of the injection molding device 1 includes the determination unit 61, the storage unit 62 and a viscosity estimation unit 66. The determination unit 61 and the viscosity estimation unit 66 are made up of the processor that makes up the computer device 60 described above, and function by executing a computer program.

The viscosity estimation unit 66 estimates viscosity of molten resin flowing through the resin channel P in the mold 30. The viscosity estimation unit 66 estimates the viscosity of the molten resin based on channel pressure data, screw pressure data, nozzle pressure data, control data at the control device 50, and so forth. A plurality of specific examples of the viscosity estimation unit 66 will be described below.

The determination unit 61 determines presence/absence of clogging of the gate P3 by taking into consideration the viscosity estimated by the viscosity estimation unit 66 (hereinafter referred to as "estimated resin viscosity") to the channel pressure data. Note that, in addition to the channel pressure data and the estimated resin viscosity, the determination unit 61 may use the screw pressure data as in the first embodiment, and may further use the nozzle pressure data and the control data of the control device 50.

Also, the determination unit 61 applies machine learning to determine presence/absence of clogging of the gate P3. Accordingly, the determination unit 61 determines presence/absence of clogging of the gate P3 using a trained model that is generated in advance. The storage unit 62 stores the trained model used by the determination unit 61 to determine presence/absence of clogging of the gate P3.

Figure 13:
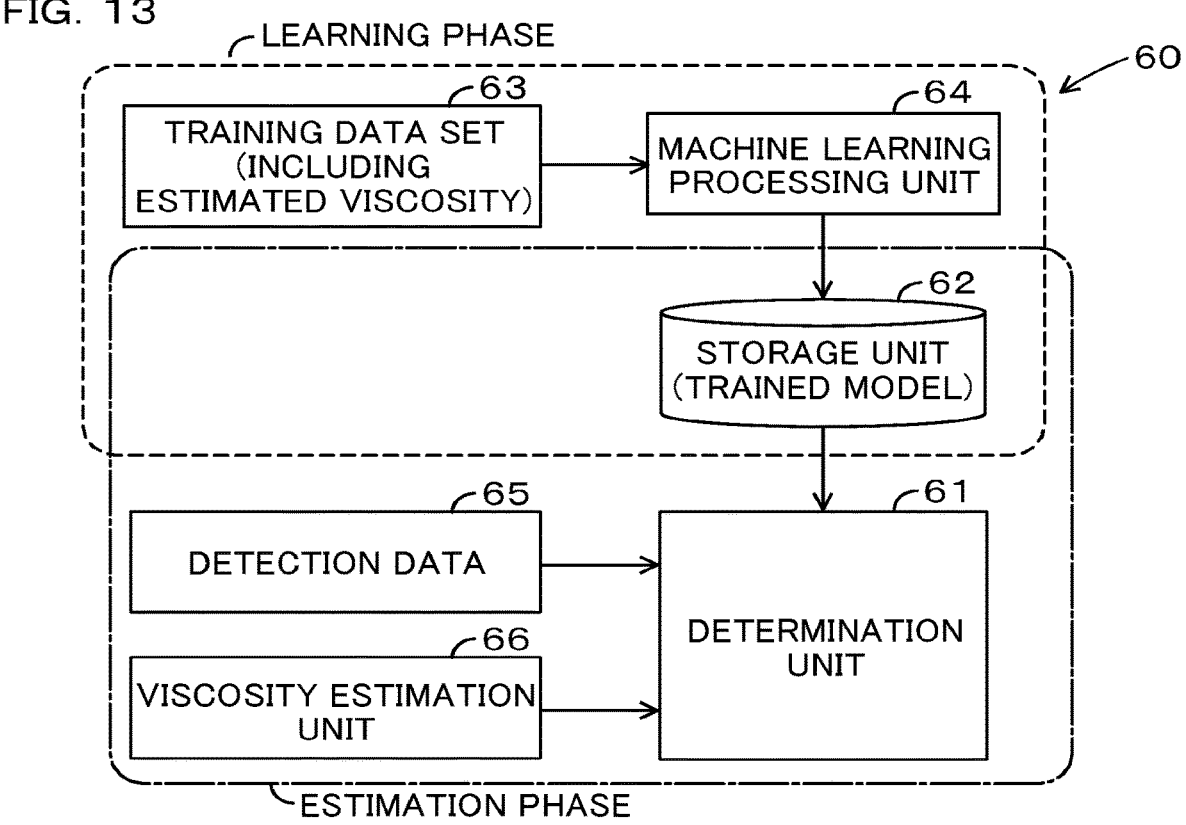
FIG. 13 is a functional block diagram illustrating processing performed by a gate clogging determination computer device that makes up the injection molding device according to the second embodiment.

The functions of the computer device 60 when applying machine learning will be described with reference to FIG. 13. As a learning phase, first, the training data set 63 is prepared. The training data set 63 includes the features of the channel pressure data, the estimated resin viscosity estimated by the viscosity estimation unit 66, and label data indicating the presence/absence of clogging of the gate P3. Note that the training data set 63 may further include the features of the screw pressure data, the features of the nozzle pressure data, and so forth.

As a learning phase, the machine learning processing unit 64 in the computer device 60 performs machine learning using the training data set 63 to generate one trained model. The trained model is stored in the storage unit 62. In the present embodiment, the trained model uses the features of the channel pressure data and the estimated resin viscosity as explanatory variables, and presence/absence of clogging of the gate P3 as an objective variable.

Subsequently, as an estimation phase, the determination unit 61 acquires at least channel pressure data as the detection data 65, and the estimated resin viscosity estimated by the viscosity estimation unit 66. The determination unit 61 then calculates the features of the channel pressure data. Subsequently, the determination unit 61 determines presence/absence of clogging of the gate P3, using the trained model stored in the storage unit 62, by inputting the features of the channel pressure data and the estimated resin viscosity.

12. Behavior of Screw Pressure Data and Channel Pressure Data

Behavior (temporal change) of the screw pressure data and behavior (temporal change) of the channel pressure data in the injection process S4 and the pressure-holding process S5 will be described with reference to FIG. 14 to FIG. 17. In FIG. 14 to FIG. 17, thick lines indicate cases in which the resin viscosity in the resin channel P is high, and thin lines indicate cases in which the resin viscosity in the resin channel P is low.

Figure 14:
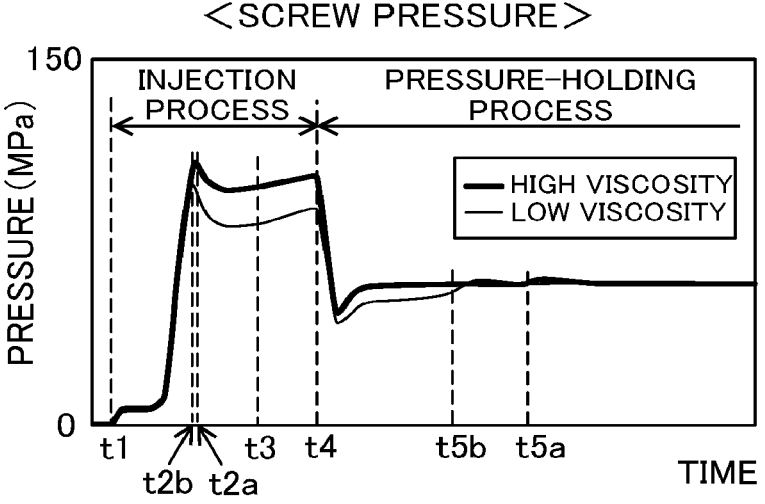
FIG. 14 is a graph showing temporal change in screw pressure data in the injection process and the pressure-holding process. A thick line indicates a case in which resin viscosity is high, and a thin line indicates a case in which resin viscosity is low.
Figure 15:
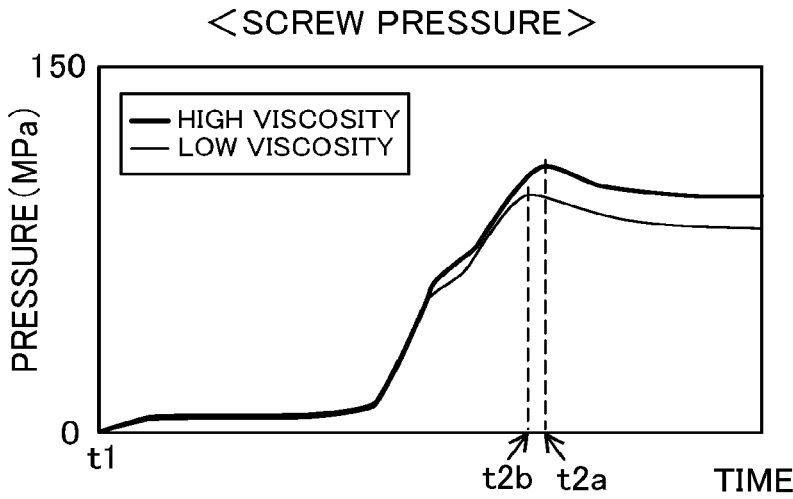
FIG. 15 is a graph in which spans time t1 to t2a and t1 to t2b in FIG. 14 are enlarged, in which the thick line indicates the case in which resin viscosity is high and the thin line indicates the case in which resin viscosity is low.

As shown in FIGS. 14 and 15, the screw pressure data varies in values between the pressure peak times t2a and t2b in the injection process S4 and the injection process end time t4. That is to say, in these time periods (t2a to t4 and t2b to t4), the screw pressure data indicates a low value when the resin viscosity is low, and the screw pressure data indicates a high value when the resin viscosity is high.

Also, as shown in FIG. 15, in the screw pressure data, the time from the start time t1 of the injection process S4 to the pressure peak times t2a and t2b in the injection process S4 (t1 to t2a and t1 to t2b) varies depending on the resin viscosity. That is to say, the time (t1 to t2b) when the resin viscosity is low is shorter than the time (t1 to t2a) when the resin viscosity is high.

Also, as shown in FIG. 14, in the screw pressure data, the time from the start time t4 of the pressure-holding process S5 to filling completion times t5a and t5b of the molded product cavity C in the pressure-holding process S5 (t4 to t5a and t4 to t5b) varies depending on the resin viscosity. That is to say, the time (t4 to t5b) when the resin viscosity is low is shorter than the time (t4 to t5a) when the resin viscosity is high. The filling completion times t5a and t5b are the times at which the pressure of the screw pressure data in the pressure-holding process S5 rises, albeit slightly. That is to say, the filling completion times t5a and t5b are times when the pressure change in the screw pressure data in the pressure-holding process S5 exceeds a predetermined value.

Now, the injection process S4 ends when a predetermined amount of time has elapsed from the start, and accordingly the end time t4 of the injection process S4 is constant regardless of the resin viscosity. Accordingly, the same holds true in a case in which the above times (t4 to t5a and t4 to t5b) are the substituted with the filling completion times t5a and t5b of the molded product cavity C in the pressure-holding process S5 from the start time t1 in the injection process S4 (t1 to t5a and t1 to t5b).

Figure 16:
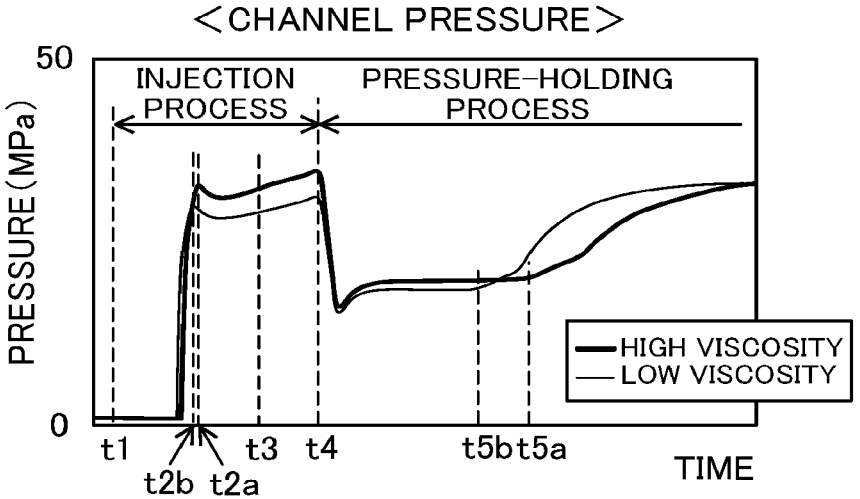
FIG. 16 is a graph showing temporal change in channel pressure data in the injection process and the pressure-holding process. The thick line indicates the case in which resin viscosity is high, and the thin line indicates the case in which resin viscosity is low.
Figure 17:
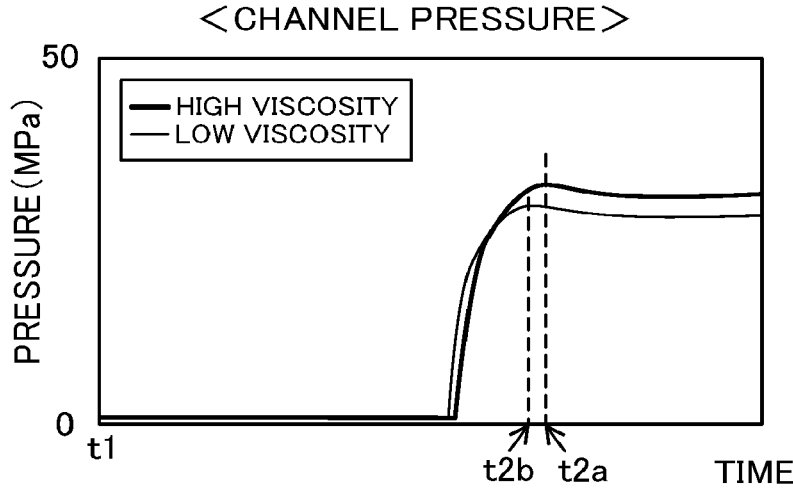
FIG. 17 is a graph in which spans time t1 to t2a and t1 to t2b in FIG. 16 are enlarged, in which the thick line indicates the case in which resin viscosity is high and the thin line indicates the case in which resin viscosity is low.

As shown in FIG. 16 and FIG. 17, the channel pressure data behaves similar to the screw pressure data. The channel pressure data varies in values between the pressure peak times t2a and t2b in the injection process S4 and the injection process end time t4. That is to say, in these time periods (t2a to t4 and t2b to t4), the screw pressure data indicates a low value when the resin viscosity is low, and the screw pressure data indicates a high value when the resin viscosity is high.

Also, as shown in FIG. 17, in the channel pressure data, the time from the start time t1 of the injection process S4 to the pressure peak times t2a and t2b in the injection process S4 (t1 to t2a and t1 to t2b) varies depending on the resin viscosity. That is to say, the time (t1 to t2b) when the resin viscosity is low is shorter than the time (t1 to t2a) when the resin viscosity is high.

Also, as shown in FIG. 16, in the channel pressure data, the time from the start time t4 of the pressure-holding process S5 to the filling completion times t5a and t5b of the molded product cavity C in the pressure-holding process S5 (t4 to t5a and t4 to t5b) varies depending on the resin viscosity. That is to say, the time (t4 to t5b) when the resin viscosity is low is shorter than the time (t4 to t5a) when the resin viscosity is high. The filling completion times t5a and t5b are times when the pressure of the channel pressure data in the pressure-holding process S5 rises. That is to say, the filling completion times t5a and t5b are times when the pressure change in the channel pressure data in the pressure-holding process S5 exceeds a predetermined value. The pressure change in the channel pressure data changes greatly as compared to that of screw pressure data.

Now, the same holds true in a case in which the above times (t4 to t5a and t4 to t5b) are the substituted with the filling completion times t5a and t5b of the molded product cavity C in the pressure-holding process S5 from the start time t1 in the injection process S4 (t1 to t5a and t1 to t5b).

13. Effects of Second Embodiment

When the resin viscosity is different, the channel pressure data and the screw pressure data indicate different values. That is to say, there are cases in which determining whether change in the channel pressure data and the screw pressure data is due to clogging of the gate P3, or due to resin viscosity, is not easy.

In the injection molding device 1 according to the second embodiment, the determination unit 61 determines presence/absence of clogging of the gate P3 by taking into consideration the estimated resin viscosity with respect to the channel pressure data and the screw pressure data. Accordingly, the determination unit 61 can determine presence/absence of clogging of the gate P3 with high accuracy.

14. First Modification of Second Embodiment

Figure 18:
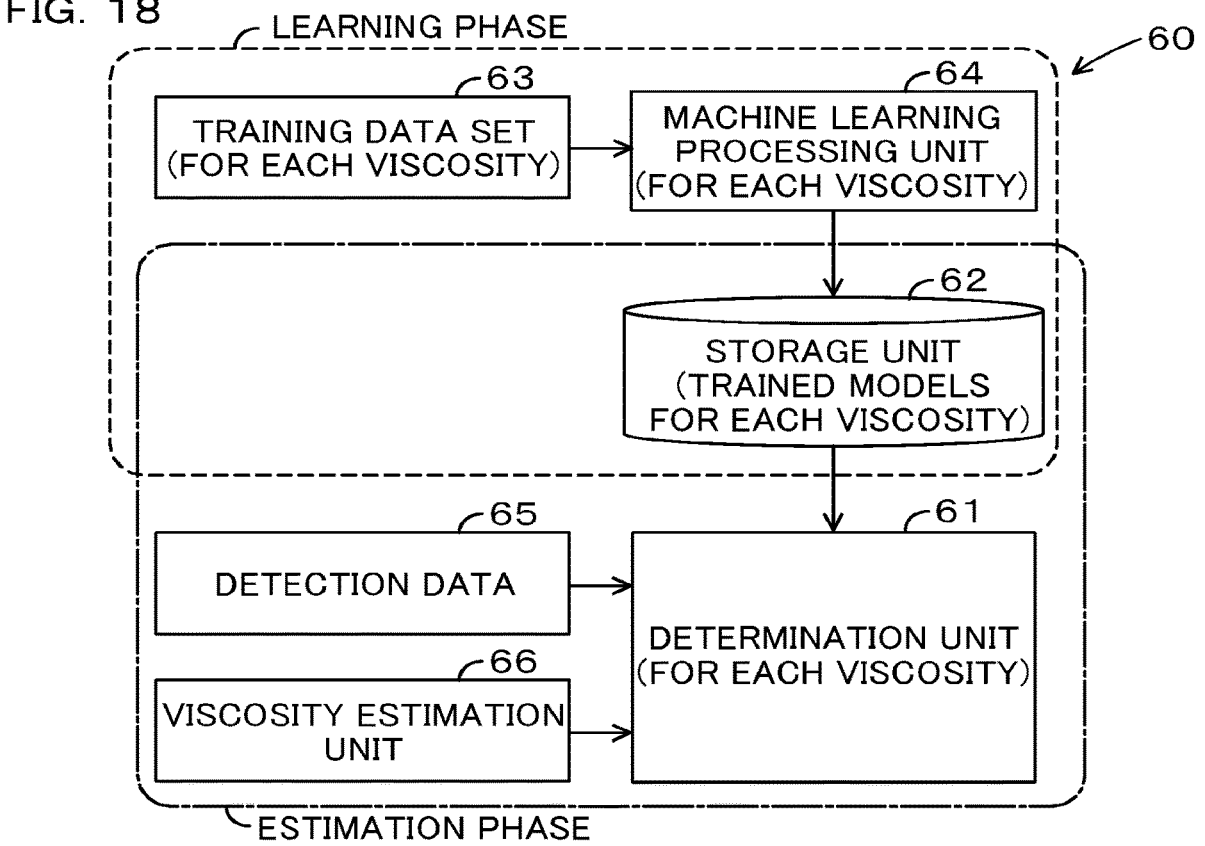
FIG. 18 is a functional block diagram illustrating processing performed by a gate clogging determination computer device according to a first modification of the second embodiment.

An injection molding device 1 according to a first modification of the second embodiment will be described with reference to FIG. 18. FIG. 18 illustrates functions of the computer device 60 when machine learning is applied. As a learning phase, first, the training data set 63 is prepared. The training data set 63 includes the features of the channel pressure data classified by the resin viscosity estimated by the viscosity estimation unit 66, and label data indicating the presence/absence of clogging of the gate P3. Note that the training data set 63 may further include the features of the screw pressure data, the features of the nozzle pressure data, and so forth.

As a learning phase, the machine learning processing unit 64 in the computer device 60 performs machine learning, for each estimated resin viscosity, using the training data set 63 to generate a plurality of trained models, for each estimated resin viscosity. The plurality of trained models for each estimated resin viscosity is stored in the storage unit 62. In the present modification, each trained model uses the features of the channel pressure data as an explanatory variable, and presence/absence of clogging of the gate P3 as an objective variable.

Subsequently, as an estimation phase, the determination unit 61 acquires at least channel pressure data as the detection data 65, and the estimated resin viscosity estimated by the viscosity estimation unit 66. The determination unit 61 then calculates the features of the channel pressure data. Subsequently, the determination unit 61 selects one trained model corresponding to the estimated resin viscosity from among the plurality of trained models stored in the storage unit 62. Subsequently, the determination unit 61 determines presence/absence of clogging of the gate P3 by inputting the features of the channel pressure data, using the selected trained model. That is to say, the determination unit 61 performs classification by estimated resin viscosity, and determines presence/absence of clogging of the gate P3 in accordance with the classified estimated resin viscosities. In this case as well, the same effects as those of the above-described second embodiment are exhibited.

15. Second Modification of Second Embodiment

Figure 19:
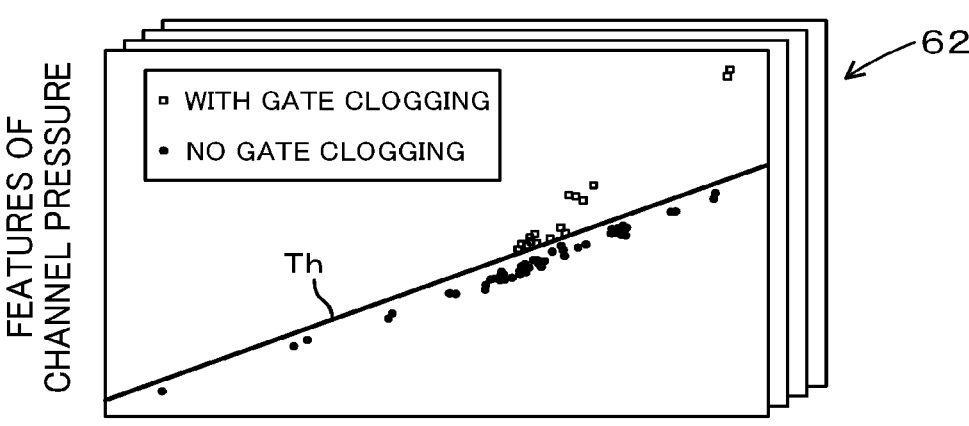
FIG. 19 is a diagram describing threshold values stored in a storage unit in a second modification of the second embodiment.

An injection molding device 1 according to a second modification of the second embodiment will be described with reference to FIG. 19. In the first modification of the second embodiment described above, the storage unit 62 of the computer device 60 stores a plurality of trained models generated by machine learning for each estimated resin viscosity, and the determination unit 61 selects one of the plurality of trained models, and determines presence/absence of clogging of the gate P3 using the selected trained model.

In the present modification, the storage unit 62 stores the threshold value Th used for determining presence/absence of clogging of the gate P3. The threshold value Th is set for each estimated resin viscosity, as shown in FIG. 19. The threshold value Th is set in with regard to the relation between the screw pressure data and the channel pressure data, for each estimated resin viscosity. As shown in FIG. 19, the determination unit 61 determines that there is clogging of the gate P3 in the region above the threshold value Th indicated by the continuous line in the two-dimensional coordinate system representing the relation between the screw pressure data and the channel pressure data, for each estimated resin viscosity. On the other hand, the determination unit 61 determines that there is no clogging of the gate P3 in the region below the threshold value Th.

The threshold value Th can be set by obtaining a great count of channel pressure data and of screw pressure data for each of presence/absence of clogging of the gate P3. Note that in FIG. 19, the threshold value Th is shown by a straight line, but may be set by a curve.

16. First Specific Example of Resin Viscosity Estimation

The viscosity estimation unit 66 estimates the viscosity of the molten resin in the resin channel P in the second embodiment and the modifications thereof. A first specific example of a resin viscosity estimation method by the viscosity estimation unit 66 will be described with reference to FIG. 16 to FIG. 17, and FIG. 20.

Also, as shown in FIG. 16 and FIG. 17, the time from the start time t1 of the injection process S4 to the pressure peak times t2a and t2b in the injection process S4 (t1 to t2a and t1 to t2b) varies in the channel pressure data, depending on the resin viscosity in the resin channel P. Accordingly, the viscosity estimation unit 66 estimates the resin viscosity, with the time (t1 to t2a and t1 to t2b) from the start time t1 of the injection process S4 to the pressure peak times t2a and t2b of the channel pressure data in the injection process S4 as a component representing the resin viscosity.

(17. Second Specific Example of Resin Viscosity Estimation) A second specific example of a resin viscosity estimation method by the viscosity estimation unit 66 will be described with reference to FIG. 16 to FIG. 17, and FIG. 20. As shown in FIGS. 16 and 17, in the channel pressure data, the time (t1 to t5a and t1 to t5b, or t4 to t5a and t4 to t5b) from the start time t1 of the injection process S4 or the start time t4 of the pressure-holding process S5, to the filling completion times t5a and t5b of the molded product cavity C in the pressure-holding process S5, varies depending on the resin viscosity of the resin channel P.

Figure 20:
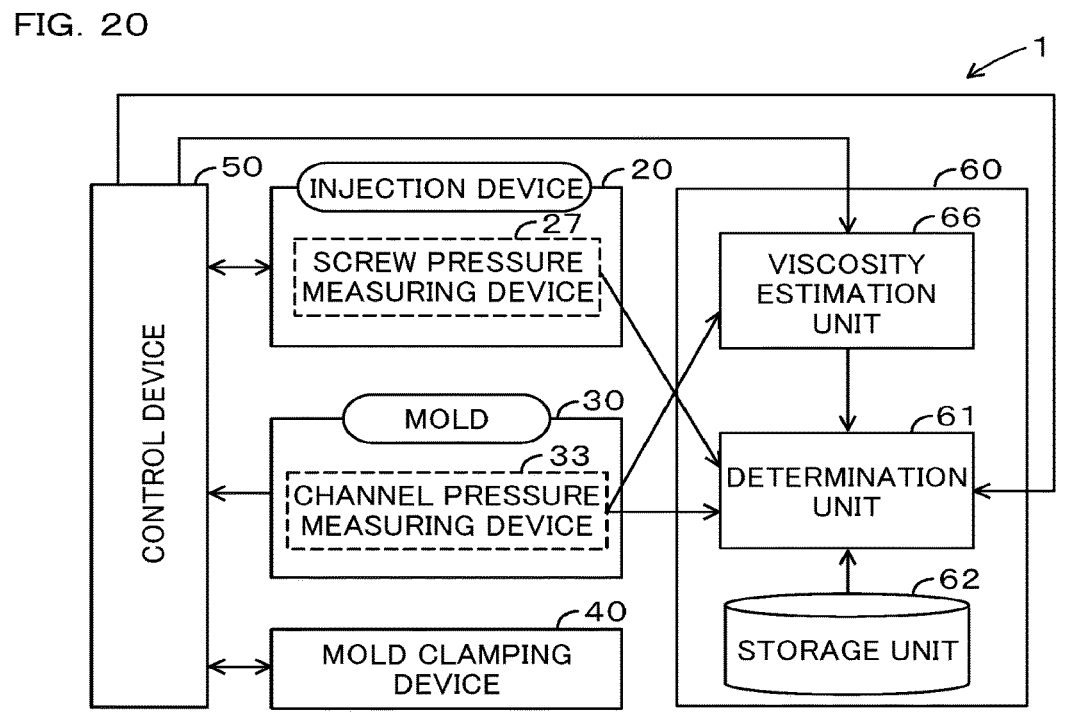

Thus, as illustrated in FIG. 20, the viscosity estimation unit 66 estimates the resin viscosity, with the time (t1 to t5a and t1 to t5b, or t4 to t5a and t4 to t5b) from the start time t1 of the injection process S4 or the start time t4 of the pressure-holding process S5, to the filling completion times t5a and t5b of the molded product cavity C in the pressure-holding process S5 in the channel pressure data, as a component representing the resin viscosity.

18. Third Specific Example of Resin Viscosity Estimation

A third specific example of a resin viscosity estimation method by the viscosity estimation unit 66 will be described with reference to FIG. 14 to FIG. 15, and FIG. 21. As shown in FIG. 14 and FIG. 15, the time from the start time t1 of the injection process S4 to the pressure peak times t2a and t2b of screw pressure data in the injection process S4 (t1 to t2a and t1 to t2b) varies, depending on the resin viscosity in the resin channel P. Accordingly, the viscosity estimation unit 66 estimates the resin viscosity, with the time (t1 to t2a and t1 to t2b) from the start time t1 of the injection process S4 to the pressure peak times t2a and t2b of the screw pressure data in the injection process S4 as a component representing the resin viscosity.

19. Fourth Specific Example of Resin Viscosity Estimation

A fourth specific example of a resin viscosity estimation method by the viscosity estimation unit 66 will be described with reference to FIG. 14 to FIG. 15, and FIG. 21. As shown in FIGS. 14 and 15, in the screw pressure data, the time (t1 to t5a and t1 to t5b, or t4 to t5a and t4 to t5b) from the start time t1 of the injection process S4 or the start time t4 of the pressure-holding process S5, to the filling completion times t5a and t5b of the molded product cavity C in the pressure-holding process S5, varies depending on the resin viscosity of the resin channel P.

Figure 21:
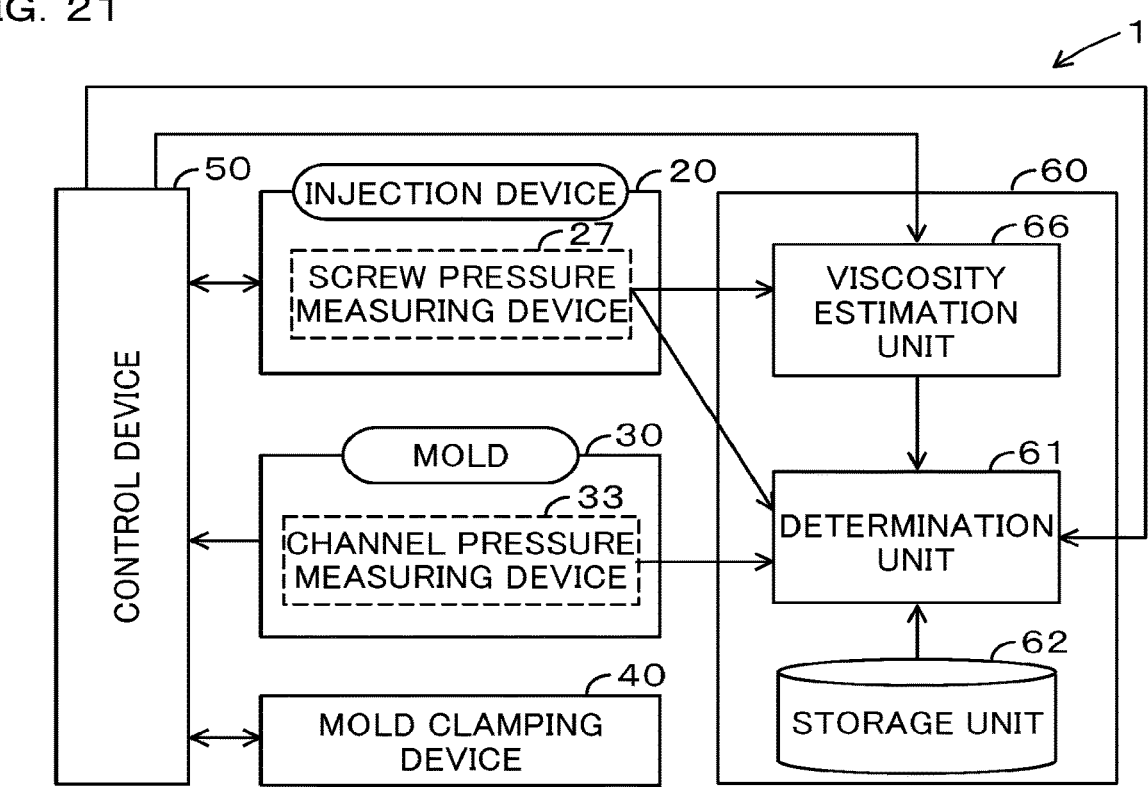
FIG. 21 is a functional block diagram illustrating an injection molding device corresponding to a third specific example and a fourth specific example of the resin viscosity estimation method according to the second embodiment.

Thus, as illustrated in FIG. 21, the viscosity estimation unit 66 estimates the resin viscosity, with the time (t1 to t5a and t1 to t5b, or t4 to t5a and t4 to t5b) from the start time t1 of the injection process S4 or the start time t4 of the pressure-holding process S5, to the filling completion times t5a and t5b of the molded product cavity C in the pressure-holding process S5 in the screw pressure data, as a component representing the resin viscosity.

20. Fifth Specific Example of Resin Viscosity Estimation

Figure 22:
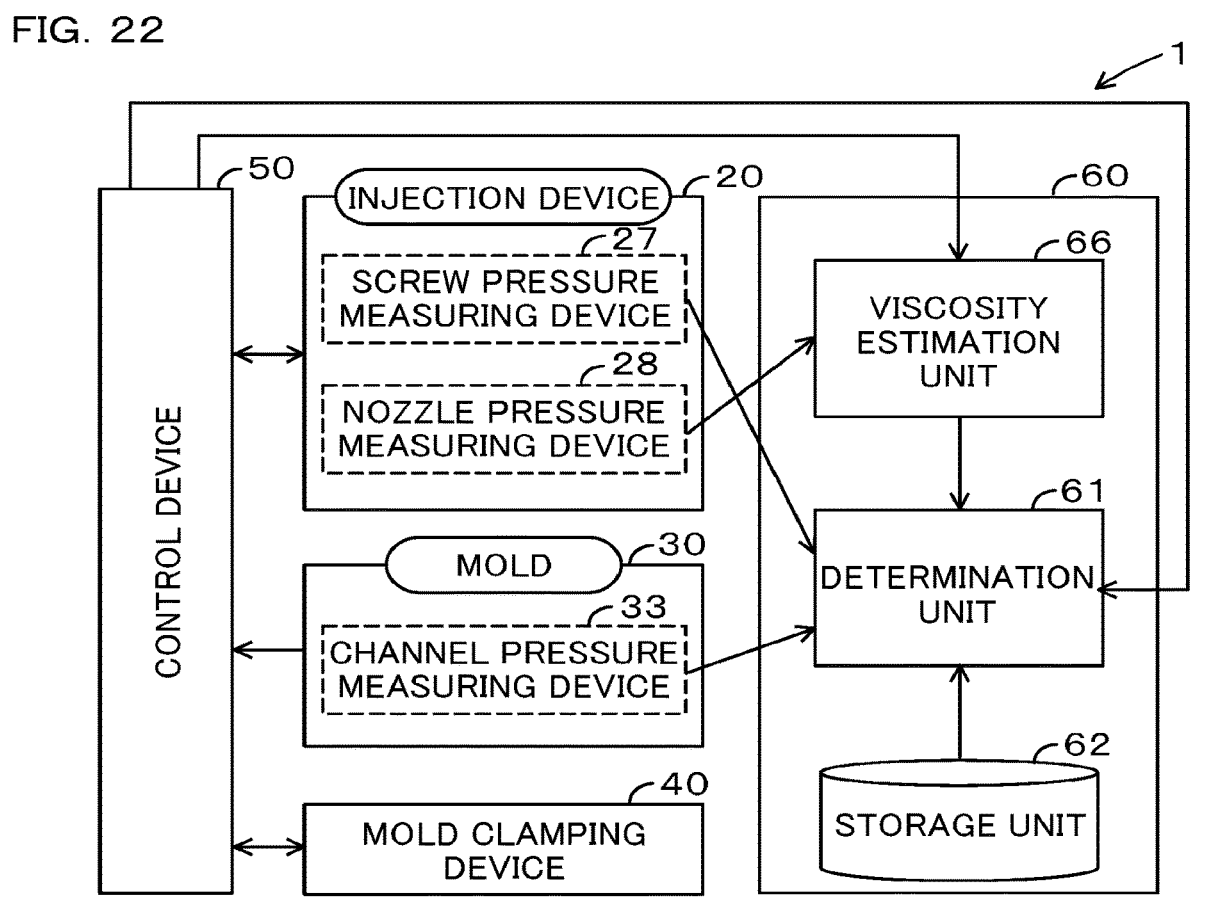

A fifth specific example of a resin viscosity estimation method by the viscosity estimation unit 66 will be described with reference to FIG. 22 to FIG. 24. As illustrated in FIG. 22, the viscosity estimation unit 66 estimates resin viscosity using nozzle pressure data acquired by the nozzle pressure measuring device 28 and control data in the control device 50.

Figure 23:
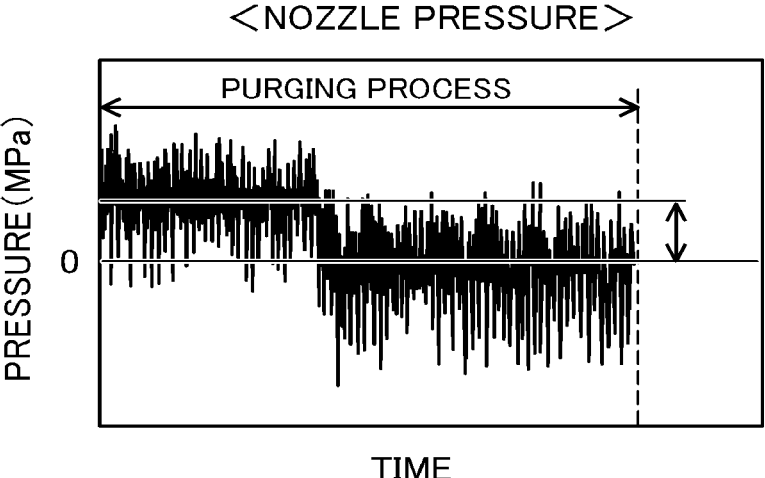
FIG. 23 is a graph showing temporal change in nozzle pressure data in a purging process, showing a case in which resin viscosity is low.
Figure 24:
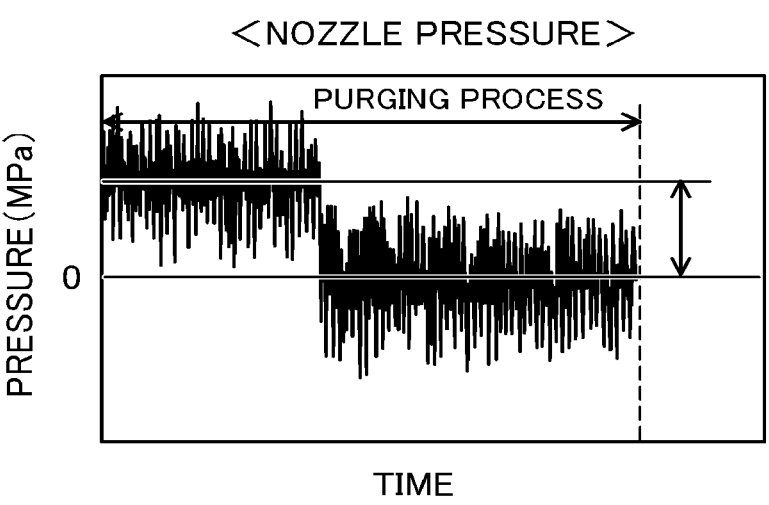
FIG. 24 is a graph showing temporal change in nozzle pressure data in the purging process, showing a case in which resin viscosity is high.

Behavior (temporal change) of the nozzle pressure data in the purging process S1 is as shown in FIG. 23 and FIG. 24. Note that in FIG. 23 and FIG. 24, it is assumed that the speed of movement of the screw 23 is the same. When the moving speed of the screw 23 is the same, the average value of the nozzle pressure data in the purging process S1 is smaller when the resin viscosity is low as shown in FIG. 23, as compared to when the resin viscosity is high as shown in FIG. 24. Accordingly, the nozzle pressure data in the purging process S1 is dependent on the resin viscosity.

When the speed of movement of the screw 23 is great, the nozzle pressure data increases. Accordingly, the viscosity estimation unit 66 estimates the resin viscosity using the relation between the nozzle pressure data and the movement speed data of the screw 23 in the purging process S1 as a component representing the resin viscosity.

21. Sixth Specific Example of Resin Viscosity Estimation

In the fifth specific example, the viscosity estimation unit 66 estimates the resin viscosity using the nozzle pressure data and the movement speed data of the screw 23 in the purging process S1. Now, the nozzle pressure data similarly changes in the injection process S4. Accordingly, in a sixth specific example, the viscosity estimation unit 66 estimates the resin viscosity using the relation between the nozzle pressure data and the movement speed data of the screw 23 in the injection process S4 as a component representing the resin viscosity.

22. Seventh Specific Example of Resin Viscosity Estimation

Figure 25:
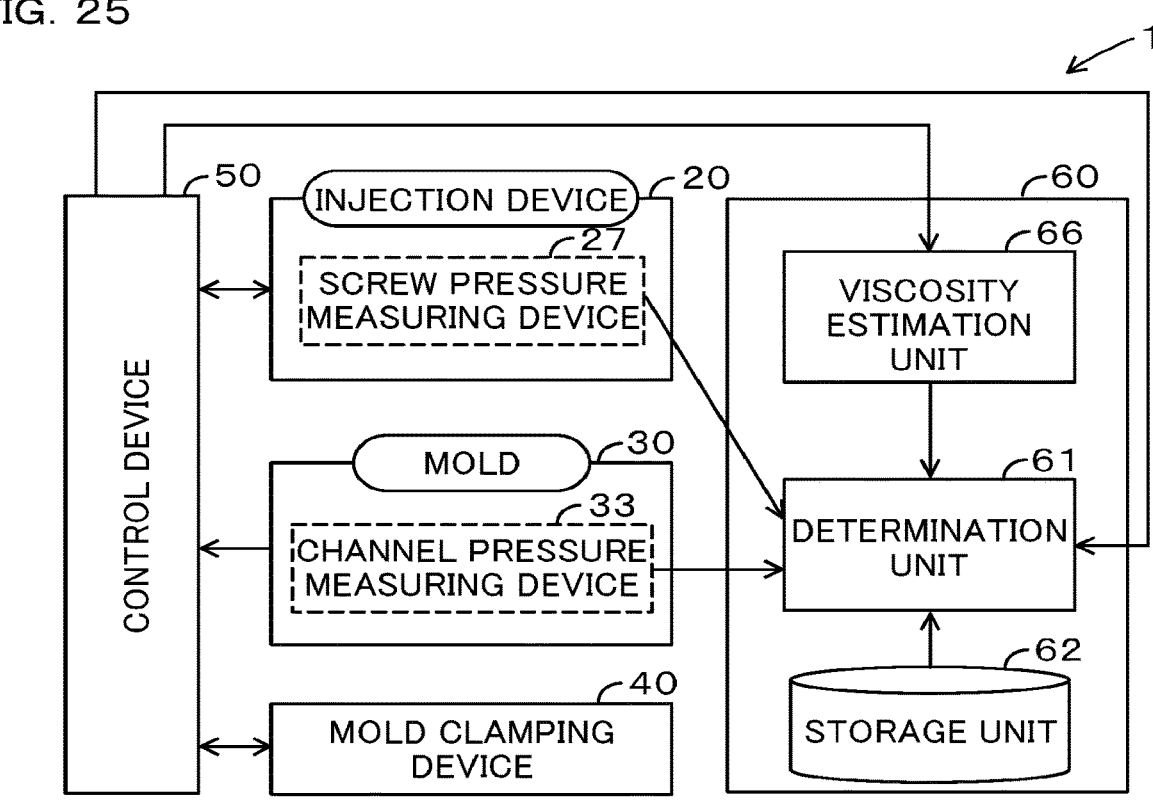
FIG. 25 is a functional block diagram illustrating an injection molding device corresponding to a sixth specific example of the resin viscosity estimation method according to the second embodiment.
Figure 26:
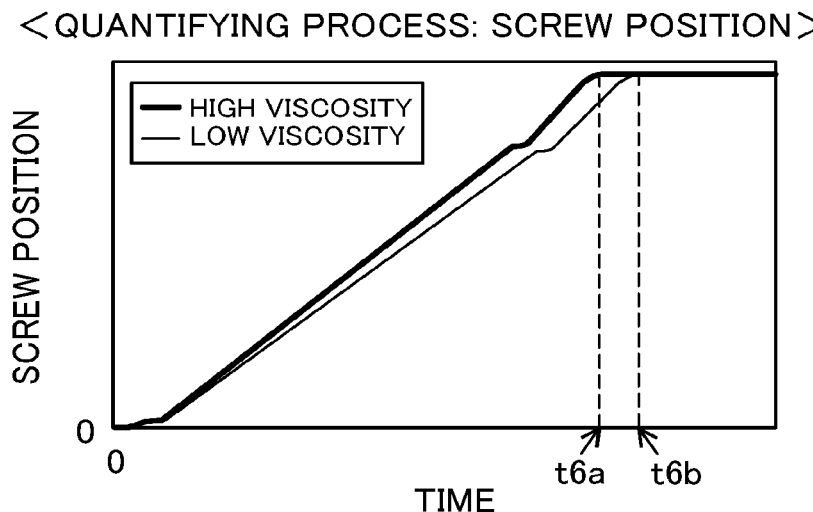
FIG. 26 is a graph showing temporal change of a screw position in a quantifying process.

A seventh specific example of a resin viscosity estimation method by the viscosity estimation unit 66 will be described with reference to FIG. 25 and FIG. 26. As illustrated in FIG. 25, the viscosity estimation unit 66 estimates the resin viscosity using the control data in the control device 50.

The time required for the quantifying processes S2 and S10 is affected by the resin viscosity. As shown in FIG. 26, the time from the start time of the quantifying processes S2 and S10 to the end times t6a and t6b of the quantifying processes S2 and S10 is longer when the resin viscosity is low, as compared to when the resin viscosity is high. The reason is that the lower the resin viscosity is, the smaller the pressure that the screw 23 receives from the molten resin is. Accordingly, the viscosity estimation unit 66 estimates the resin viscosity using the time required for the quantifying processes S2 and S10 as a component representing the resin viscosity.

23. Eighth Specific Example of Resin Viscosity Estimation

An eighth specific example of a resin viscosity estimation method by the viscosity estimation unit 66 will be described.

In the above first to seventh specific examples, the viscosity estimation unit 66 estimates the resin viscosity using each element as a component representing the resin viscosity.

Separately from this, the viscosity estimation unit 66 estimates the resin viscosity using the elements described in the first to seventh specific examples as one of the components representing the resin viscosity. That is to say, the viscosity estimation unit 66 estimates the resin viscosity using a plurality of elements, each of which is one of the components representing the resin viscosity. The viscosity estimation unit 66 uses a plurality of elements, and accordingly it is preferable to apply machine learning. As a matter of course, the viscosity estimation unit 66 can also estimate the viscosity by using a database in which a plurality of elements is accumulated.

The invention claimed is:

1. An injection molding device, comprising:
an injection device including a cylinder, a screw, and a nozzle provided at a front end of the cylinder, for discharging molten resin as the screw advances;
a mold including a molded product cavity, and a resin channel between the molded product cavity and a portion abutting the nozzle;
a channel pressure measuring device for acquiring channel pressure data in the resin channel;
a viscosity estimation unit configured to estimate viscosity of the molten resin flowing through the resin channel in the mold;
a determination unit configured to determine presence/absence of clogging of a gate of the resin channel, taking into consideration the viscosity estimated by the viscosity estimation unit, based on features of the channel pressure data;
a screw pressure measuring device that acquires screw pressure data regarding pressure the screw receives from molten resin in the cylinder; and
a control device configured to control the injection device, the control device executing a molding cycle including
an injection process of injecting molten resin from the nozzle into the mold by performing speed control of the screw, and
a pressure-holding process of applying a holding pressure to the molten resin in the molded product cavity by performing pressure control of pressure applied to the screw, performed following the injection process, wherein the determination unit is configured to determine presence/absence of clogging of the gate based on the features of the channel pressure data in the injection process and features of the screw pressure data in the injection process.

2. The injection molding device according to claim 1, wherein
the resin channel includes a plurality of gates connected to one of the molded product cavity, and
the determination unit is configured to determine presence/absence of clogging of part of gates of the plurality of gates.

3. The injection molding device according to claim 1, wherein the determination unit is configured to determine presence/absence of temporary clogging of the gate in a phenomenon occurring when executing the molding cycle for forming a molded product a plurality of times successively, in which clogging of the gate temporarily occurs, following which the clogging of the gate is resolved.

4. The injection molding device according to claim 1, wherein the determination unit is configured to determine presence/absence of temporary clogging of the gate in a phenomenon occurring when supplying molten resin to the molded product cavity in molding of one molded product, in which clogging of the gate temporarily occurs, following which the clogging of the gate is resolved.

5. The injection molding device according to claim 1, wherein the channel pressure data is pressure data at a position different from that of the gate in the resin channel.

6. The injection molding device according to claim 1, wherein the determination unit is configured to determine presence/absence of clogging of the gate based on features of the channel pressure data in a later time period closer to the pressure-holding process in the injection process, and features of the screw pressure data in the later time period closer to the pressure-holding process in the injection process.

7. The injection molding device according to claim 1, wherein the viscosity estimation unit is configured to estimate the viscosity using time from start time of the injection process to a pressure peak time of the channel pressure data in the injection process as one of components representing the viscosity.

8. The injection molding device according to claim 7, wherein the viscosity estimation unit is configured to estimate the viscosity, using time from time start of the injection process or start of the pressure-holding process to a filling completion time of the molded product cavity in the pressure-holding process, as one of the components representing the viscosity.

9. The injection molding device according to claim 8, wherein the filling completion time is a pressure rising time in the channel pressure data in the pressure-holding process.

10. The injection molding device according to claim 9, wherein the filling completion time is a time at which pressure change in the channel pressure data in the pressure-holding process becomes greater than a predetermined value.

11. The injection molding device according to claim 7, further comprising a second screw pressure measuring device that acquires second screw pressure data regarding pressure the screw receives from the molten resin in the cylinder, wherein the viscosity estimation unit is configured to estimate the viscosity using the second screw pressure data as one of the components representing the viscosity.

12. The injection molding device according to claim 11, wherein the viscosity estimation unit is configured to estimate the viscosity using time from start time of the injection process to a pressure peak time of the second screw pressure data in the injection process as one of components representing the viscosity.

13. The injection molding device according to claim 7, further comprising a nozzle pressure measuring device for acquiring nozzle pressure data regarding pressure the nozzle receives from molten resin when the molten resin flows through the nozzle, wherein
the control device is configured to execute a purging process, in which molten resin in the cylinder is discharged from the nozzle in a state in which the nozzle is separated from the mold, before performing the molding cycle a plurality of times successively, and
the viscosity estimation unit is configured to estimate the viscosity using a relation between the nozzle pressure data in the purging process and movement speed data of the screw in the purging process, as one of the components representing the viscosity.

14. The injection molding device according to claim 7, further comprising a second nozzle pressure measuring device for acquiring second nozzle pressure data regarding pressure the nozzle receives from the molten resin when the molten resin flows through the nozzle, wherein the viscosity estimation unit is configured to estimate the viscosity using a relation between the second nozzle pressure data in the injection process and movement speed data of the screw in the injection process, as one of the components representing the viscosity.

15. The injection molding device according to claim 7, wherein the molding cycle further includes, prior to the injection process, a quantifying process of rotating the screw located at a front position to move the molten resin to a front end side of the cylinder, and retracting the screw to a predetermined position due to a counteraction of a forward movement of the molten resin, thereby pooling a predetermined amount of molten resin in a front side of the cylinder, and the viscosity estimation unit is configured to estimate the viscosity using time required for the quantifying process as one of the components representing the viscosity.

16. The injection molding device according to claim 1, wherein the viscosity estimation unit is configured to estimate the viscosity, using time from time start of the injection process or start of the pressure-holding process to a filling completion time of the molded product cavity in the pressure-holding process, as one of the components representing the viscosity.

17. The injection molding device according to claim 16, wherein the filling completion time is a pressure rising time in the channel pressure data in the pressure-holding process.

18. The injection molding device according to claim 17, wherein the filling completion time is a time at which pressure change in the channel pressure data in the pressure-holding process becomes greater than a predetermined value.

19. The injection molding device according to claim 1, further comprising a third screw pressure measuring device that acquires third screw pressure data regarding pressure the screw receives from the molten resin in the cylinder, wherein the viscosity estimation unit is configured to estimate the viscosity using the third screw pressure data as one of the components representing the viscosity.

20. The injection molding device according to claim 19, wherein the viscosity estimation unit is configured to estimate the viscosity using time from start time of the injection process to a pressure peak time of the third screw pressure data in the injection process as one of components representing the viscosity.

21. The injection molding device according to claim 1, further comprising a third nozzle pressure measuring device for acquiring third nozzle pressure data regarding pressure the nozzle receives from the molten resin when the molten resin flows through the nozzle, wherein the control device is configured to execute a purging process, in which molten resin in the cylinder is discharged from the nozzle in a state in which the nozzle is separated from the mold, before performing the molding cycle a plurality of times successively, and the viscosity estimation unit is configured to estimate the viscosity using a relation between the third nozzle pressure data in the purging process and movement speed data of the screw in the purging process, as one of the components representing the viscosity.

22. The injection molding device according to claim 1, further comprising a fourth nozzle pressure measuring device for acquiring fourth nozzle pressure data regarding pressure the nozzle receives from the molten resin when the molten resin flows through the nozzle, and wherein the viscosity estimation unit is configured to estimate the viscosity using a relation between the fourth nozzle pressure data in the injection process and movement speed data of the screw in the injection process, as one of the components representing the viscosity.

23. The injection molding device according to claim 1, wherein the control device is configured to execute the molding cycle including a quantifying process of rotating the screw located at a front position to move molten resin to a front end side of the cylinder, and retracting the screw to a predetermined position due to a counteraction of a forward movement of the molten resin, thereby pooling a predetermined amount of the molten resin in a front side of the cylinder, the injection process of injecting molten resin from the nozzle into the mold by performing speed control of the screw, performed following the quantifying process, and the pressure-holding process of applying the holding pressure to the molten resin in the molded product cavity by performing pressure control of pressure applied to the screw, performed following the injection process, wherein the viscosity estimation unit is configured to estimate the viscosity using time required for the quantifying process as one of the components representing the viscosity.

24. The injection molding device according to claim 1, further comprising a storage unit that stores a trained model generated by performing machine learning using a training data set containing the features of the channel pressure data, the features of the screw pressure data, and label data of presence/absence of clogging of the gate, wherein the determination unit is configured to estimate presence/absence of clogging of the gate by inputting the features of the channel pressure data and the features of the screw pressure data, using the trained model.

25. The injection molding device according to claim 1, further comprising a storage unit that stores a trained model generated by performing machine learning using a training data set containing the features of the channel pressure data, the viscosity that is estimated, and label data of presence/absence of clogging of the gate, wherein the determination unit is configured to estimate presence/absence of clogging of the gate by inputting the features of the channel pressure data and the viscosity that is estimated, using the trained model.

26. The injection molding device according to claim 1, wherein the determination unit is configured to perform classification according to the viscosity estimated by the viscosity estimation unit, and configured to determine presence/absence of clogging of the gate for the viscosity that is classified.

27. The injection molding device according to claim 26, further comprising a storage unit that stores a plurality of trained models for each viscosity generated by performing machine learning using a training data set containing, for the viscosity that is estimated, the features of the channel pressure data and label data of presence/absence of clogging of the gate, wherein the determination unit is configured to select one trained model corresponding to the viscosity estimated by the viscosity estimation unit from among the plurality of trained models, and determine presence/absence of clogging of the gate by inputting the features of the channel pressure data, using the selected trained model.

28. An injection molding device, comprising:

an injection device including a cylinder, a screw, and a nozzle provided at a front end of the cylinder, for discharging molten resin as the screw advances;

a mold including a molded product cavity, and a resin channel between the molded product cavity and a portion abutting the nozzle;

a channel pressure measuring device for acquiring channel pressure data in the resin channel;

a viscosity estimation unit configured to estimate viscosity of the molten resin flowing through the resin channel in the mold;

a determination unit configured to determine presence/absence of clogging of a gate of the resin channel, taking into consideration the viscosity estimated by the viscosity estimation unit, based on features of the channel pressure data;

a screw pressure measuring device that acquires screw pressure data regarding pressure the screw receives from molten resin in the cylinder; and a control device configured to control the injection device, the control device executing a molding cycle including an injection process of injecting molten resin from the nozzle into the mold by performing speed control of the screw, and a pressure-holding process of applying a holding pressure to the molten resin in the molded product cavity by performing pressure control of pressure applied to the screw, performed following the injection process, wherein the viscosity estimation unit configured to estimate the viscosity using time from start time of the injection process to a pressure peak time of the channel pressure data in the injection process as one of components representing the viscosity.

\* \* \* \* \*